US00RE50584E

(19) United States
(12) Reissued Patent
Awad

(10) Patent Number: US RE50,584 E
(45) Date of Reissued Patent: Sep. 9, 2025

(54) RESOURCE ALLOCATION

(71) Applicant: NEC CORPORATION, Tokyo (JP)

(72) Inventor: Yassin Aden Awad, Uxbridge (GB)

(73) Assignee: NEC CORPORATION, Tokyo (JP)

(21) Appl. No.: 17/401,836

(22) Filed: Aug. 13, 2021

Related U.S. Patent Documents

Reissue of:
(64) Patent No.: 8,532,050
Issued: Sep. 10, 2013
Appl. No.: 12/998,558
PCT Filed: Oct. 29, 2009
PCT No.: PCT/JP2009/068943
§ 371 (c)(1),
(2) Date: May 2, 2011
PCT Pub. No.: WO2010/061717
PCT Pub. Date: Jun. 3, 2010

U.S. Applications:
(63) Continuation of application No. 16/432,549, filed on Jun. 5, 2019, now Pat. No. Re. 48,739, which is a
(Continued)

(30) Foreign Application Priority Data

Nov. 3, 2008 (GB) ..... 0820109

(51) Int. Cl.
*H04W 4/00* (2018.01)
*H04L 5/00* (2006.01)

(52) U.S. Cl.
CPC ..... *H04L 5/0007* (2013.01); *H04L 5/0039* (2013.01); *H04L 5/0053* (2013.01); *H04L 5/0094* (2013.01)

(58) Field of Classification Search
None
See application file for complete search history.

(56) References Cited

U.S. PATENT DOCUMENTS 7,808,949 B2 * 10/2010 Seo et al. ..... H04L 1/0071 370/480
8,018,966 B2 * 9/2011 Seo et al. ..... H04L 5/0092 370/473

(Continued)

FOREIGN PATENT DOCUMENTS

EP 1 981 302 A1 10/2008
EP 1 983 671 A1 10/2008

(Continued)

OTHER PUBLICATIONS

TSG-RAN WG1 #53 BIS R1-082468, Carrier Aggregation in LTE Advacede, Erriccon Jul. 4, 2008.*

(Continued)

*Primary Examiner* — John M Hotaling, II
(74) *Attorney, Agent, or Firm* — Sughrue Mion, PLLC

(57) ABSTRACT

Efficient encoding techniques are described for encoding resource allocation data to be signalled to a user device. In one encoding technique one or more frequency blocks are assigned to a user device and a plurality of resource blocks within the assigned frequency blocks are allocated to the user device. The assignment of frequency blocks and the resource block allocation are encoded separately and signalled to the user device. On receipt of the signalled information the user device interprets the frequency block assignment and uses this when interpreting the resource block allocation.

8 Claims, 10 Drawing Sheets

Related U.S. Application Data continuation of application No. 14/848,959, filed on Sep. 9, 2015, now Pat. No. Re. 47,521, which is an application for the reissue of Pat. No. 8,532,050.

(56) References Cited

U.S. PATENT DOCUMENTS

| | | | | |
|---|---|---|---|---|
| 8,036,672 | B2 * | 10/2011 | Laroia et al. | 455/450 |
| 8,077,667 | B2 | 12/2011 | Kuri et al. | |
| 8,145,271 | B2 | 3/2012 | Ishii | |
| 8,249,013 | B2 | 8/2012 | Kuri et al. | |
| 8,306,544 | B2 | 11/2012 | Ishii et al. | |
| 8,345,619 | B2 | 1/2013 | Kuri et al. | |
| 8,374,162 | B2 | 2/2013 | Higuchi et al. | |
| 8,385,287 | B2 | 2/2013 | Kuri et al. | |
| 8,488,534 | B2 | 7/2013 | Miki et al. | |
| 10,945,251 | B2 * | 3/2021 | Nogami | H04W 72/23 |
| 2007/0242636 | A1 | 10/2007 | Kashima et al. | H04L 5/006 370/329 |
| 2007/0258373 | A1 * | 11/2007 | Frederiksen et al. | 370/235 |
| 2008/0123660 | A1 * | 5/2008 | Sammour | H04W 28/02 370/395.21 |
| 2008/0192847 | A1 * | 8/2008 | Classon et al. | H04L 5/0007 375/260 |
| 2009/0129362 | A1 | 5/2009 | Higuchi et al. | |
| 2009/0170522 | A1 | 7/2009 | Tirkkonen et al. | |
| 2009/0232062 | A1 | 9/2009 | Higuchi et al. | |
| 2009/0257381 | A1 | 10/2009 | Kuri et al. | H04L 5/0007 370/329 |
| 2009/0258628 | A1 | 10/2009 | Lindoff et al. | |
| 2010/0067465 | A1 | 3/2010 | Miki et al. | H04L 5/0053 370/329 |
| 2010/0105390 | A1 | 4/2010 | Ishii | |
| 2010/0113082 | A1 | 5/2010 | Ishii et al. | |
| 2010/0118719 | A1 | 5/2010 | Ishii et al. | |
| 2010/0118800 | A1 * | 5/2010 | Kim | H04L 5/0073 370/329 |
| 2010/0167772 | A1 * | 7/2010 | Fukui | H04L 5/0041 455/509 |
| 2010/0220668 | A1 | 9/2010 | Yamada et al. | |
| 2011/0013506 | A1 | 1/2011 | Ishii et al. | |
| 2011/0103338 | A1 * | 5/2011 | Astely | H04J 11/0069 370/329 |
| 2011/0182265 | A1 | 7/2011 | Kuri et al. | |
| 2011/0205995 | A1 | 8/2011 | Grovlen | |
| 2011/0305211 | A1 | 12/2011 | Lunttila et al. | |
| 2012/0008584 | A1 | 1/2012 | Higuchi et al. | |
| 2012/0020321 | A1 | 1/2012 | Higuchi et al. | |
| 2012/0120900 | A1 | 5/2012 | Kuri et al. | |
| 2012/0120901 | A1 | 5/2012 | Kuri et al. | |
| 2012/0236811 | A1 | 9/2012 | Ishii et al. | |
| 2013/0058297 | A1 | 3/2013 | Ishii et al. | |
| 2013/0136088 | A1 | 5/2013 | Kuri et al. | |

FOREIGN PATENT DOCUMENTS

| | | | | |
|---|---|---|---|---|
| JP | 2007-288754 | A | 11/2007 | |
| JP | 2008-236434 | A | 10/2008 | |
| JP | 4373410 | B2 | 11/2009 | |
| WO | WO 2007/094628 | A1 | 8/2007 | |
| WO | WO 2007/126014 | A1 | 11/2007 | |
| WO | 2008/081313 | A3 | 7/2008 | |
| WO | WO 2008081313 | A2 * | 7/2008 | |
| WO | WO 2008/105418 | A1 | 9/2008 | |
| WO | WO-2010049754 | A1 * | 5/2010 | H04L 5/0007 |

OTHER PUBLICATIONS

3GPP TSG-RAN WG1 #44BIS R1-060777, Distributed FDMA Transmission for Shard Data Channed in E-UTRA Downlink, Feb. 31, 2006.*

3GPP TS RAN1#43 R1-051331, E-UTRA Downlink Control Channel Design and TP, Motorola, Nov. 11, 2005.*

3GPP TSG-RAN WG1 LTE AD HOC Meeting, L1/L2 Control Channel Structure for E-UTRA Downlink R1-060032 , Jan. 25, 2006.*

TSG-RAN WG1#44 R1-060573, E-UTRA Downlink Control Signaling—Overhead Assessment, Erricsson, Feb. 17, 2006.*

3GPP TSG RAN WG#1#53BIS R1 082448, Carrier Aggregation in Advance E-UTRA, Huawei, Jul. 4, 2008.*

3GPP TR 25.814 V1.3.1, Technical Specification Group Radio Access Network; Physical Layer Aspects OFR Evolved UTRA (Release 7), 3GPP, Feb. 2006.*

Chinese Office Action with Search Report dated Jul. 2, 2013 in Chinese Patent Application No. 200980143825.6.

Japanese Office Action dated Jul. 24, 2013, for JP 2012-222038 with partial English Translation.

Korean Office Action for Korean Patent Application No. 10-2011-7010979 dated Jul. 11, 2012, with English translation.

NEC Group, "DL/UL Resource Signalling for TE-Advanced System", TSG-RAN WG1#55, Prague, Czech Republic Nov. 10-14, 2008 R1-084268.

NEC Group, "Downlink Control Structure for Carrier Aggregation Approach in LTE-Advanced System", TSG-RAN WG1#54Bis, R1-083491, Sep. 29-Oct. 3, 2008.

3GPP TSG RAN WG1 #54bis Sep. 29-Aug. 3, 2008, Prague, Noakia, nokia Seimens Networks, Specrum issues with carrier aggregation in LTE-Advanced, R1-083734.

3GPP TSG RAN WG1 #53BIS Jun. 30-Jul. 4, 2008, Warsaw, rapporteur (NTT DoCoMo), text proposal for RAN1 TR on LTE-Advanced R1-082575.

3GPP TSG RAN WG1 #53BIS Jun. 30-Jul. 4, 2008, Warsaw, Nokia Siemens Networks, Nokia, Uplink Multiple Access for LTE-Advanced, R1-082609.

3GPP TSG RAN WG1 #53BIS, Jun. 30-Jul. 7, 2008, Warsaw, NTT DoCoMo, Inc., Proposals for LTE—advanced technologies R1-082723.

3GPP TSG RAN WG1 #53bis, Jun. 30-Jul. 4, 2008, Warsaw, Ericsson, Carrier Aggregation in LTE—Advanced, R1-082468.

3GPP TSG RAN WG1#49, Kobe Japan, May 7-11, 2007, NEC Group, DL Unicast Resource Allocation Signalling, R1-072119.

* cited by examiner

RESOURCE ALLOCATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*NOTICE*

*More than one reissue application has been filed for the reissue of U.S. Pat. No. 8,532,050. The reissue applications are (1) the present application, (2) Ser. No. 16/432,549, and (3) Ser. No. 14/848,959 now RE47,521 issued on Jul. 16, 2019 from which the present application is a continuation reissue.*

*This is a continuation reissue application of U.S. application Ser. No. 16/532,549 filed Jun. 5, 2019, which is a continuation reissue application of U.S. Pat. No. RE47,521 issued Jul. 16, 2019, which was filed as U.S. application Ser. No. 14/848,959 on Sep. 9, 2015, which is a reissue application of U.S. Pat. No. 8,532,050 issued Sep. 10, 2013, which was filed as U.S. patent application Ser. No. 12/998,558 on May 2, 2011, which is a National Stage of International Application No. PCT/JP2009/068943 filed Oct. 29, 2019, and which claims priority from United Kingdom Application No. 0820109.7, filed Nov. 3, 2008, the disclosures of which are incorporated herein by reference in their entirety.*

TECHNICAL FIELD

The present invention relates to the signalling of resource allocations within a communication system. The invention has particular, although not exclusive relevance to the signalling of sub-carriers used in an orthogonal frequency divisional multiple access (OFDMA) communication system.

BACKGROUND ART

3GPP (which is a standard based collaboration looking at the future evolution of third generation mobile telecommunication systems) has standardised on a 20 MHz maximum bandwidth which must be supported by all so called long term evolution (LTE) devices which conform to release 8 of the relevant standards. However, in the future, more advanced (LTE-Advanced) devices are envisaged that will support an even wider bandwidth. Hence, to support such devices, the telecommunication system will be required to support a scalable bandwidth up to, for example, 100 MHz or even greater.

DISCLOSURE OF THE INVENTION

LTE-Advanced will therefore require appropriate control signalling to carry both downlink and uplink resource allocation information corresponding to frequency resources spread throughout the larger bandwidth. However, for LTE-Advanced systems supporting such a large bandwidth, the signalling overheads are potentially very high. Hence, efficient resource allocation for these systems is of critical importance.

According to one aspect of the present invention there is provided a method of signalling resource allocation data in a communication system which uses a plurality of frequency blocks in each of which a plurality of sub-carriers are arranged in a sequence of resource blocks, the method comprising: determining at least one frequency block assigned for use by a user device; determining an allocation of resource blocks within the at least one identified frequency block, for use by said user device; generating first resource allocation data identifying the at least one determined frequency block for the user device; generating second resource allocation data identifying the determined allocation of resource blocks for the user device; and signalling said first and second resource allocation data to said user device.

The second resource allocation data may be dependent on the determined at least one frequency block assigned for use by the user device.

The first resource allocation data may be different to said second resource allocation data. Furthermore the first resource allocation data may be signalled separately to or together with the second resource allocation data.

The first resource allocation data may comprise an assignment bit mask, other form of bitmap, or the like and may comprise a plurality of bits each of which respectively represents a corresponding frequency block.

Adjacent frequency blocks (e.g. those without other frequency blocks between them) may be physically contiguous or may be physically non-contiguous.

The resource blocks may be grouped in a sequence of resource block groups. The sequence of resource block groups may comprise at least one allocated resource block group comprising said determined allocation of resource blocks. The second resource allocation data may be arranged for identifying the at least one allocated resource block group, thereby to identify said determined allocation of resource blocks.

The second resource allocation data may be arranged for identifying the relative position of the at least one allocated resource block group in the sequence of resource block groups. The second resource allocation data may, for example, comprise a resource block group assignment bit mask, other bitmap, or the like. Thus, each resource block group in said determined at least one frequency block may be respectively represented by at least one bit of the assignment bit mask.

The number of bits in the second resource block allocation data may remain the same regardless of the number of frequency blocks assigned for use by said user device. The number of bits in the second resource block allocation data may be dependent on the number of frequency blocks assigned for use by said user device.

The number of bits in the resource block group assignment bit mask may be dependent on the number of frequency blocks assigned for use by said user device.

The number of resource blocks in each resource block group may be determined in dependence on the number of frequency blocks assigned for use by the user device and may be optimised to use the maximum number of bits in a resource block group assignment bit mask.

The number of blocks in each resource block group may be defined by a look up table, an equation/mathematical function or the like. For example, the number of blocks in each resource block group may be defined by:

$$P = \mathrm{ceil}\left(\frac{N_{RB}}{y - m}\right)$$

where 'm' is the size of the frequency block assignment mask (for example, 5-bits), where 'y' is the number of bits in the second resource block allocation data, and wherein $N_{RB}$ is the number of resource blocks available for allocation in the at least one assigned frequency blocks.

The allocation of resource blocks may comprise at least one contiguous sequence of resource blocks. The second resource allocation data may comprise a value which encodes a position of a start resource block of the contiguous sequence. The value may encode the number of resource blocks in the contiguous sequence.

The position of the start resource block of the contiguous sequence of resource blocks in a longer sequence of resource blocks and/or the number of resource blocks in the contiguous sequence may be mapped to the encoded value using a predetermined mapping. The predetermined mapping may be defined by at least one of: one or more equations/mathematical functions; a look-up table; a data map; and/or a data structure. The predetermined mapping may define a code tree comprising a plurality of leaf nodes and having a depth corresponding to the number of resource blocks in the longer sequence of resource blocks. The longer sequence of resource blocks may comprise a concatenated sequence of resource blocks from a plurality of frequency resource blocks.

The allocation of resource blocks may comprise a contiguous sequence of resource blocks in each frequency block assigned for use by the user device. In this case each contiguous sequence may comprise the same number of resource blocks. The start resource block of each contiguous sequence may have the same relative position in the frequency block in which it is located.

The allocation of resource blocks may comprise a contiguous sequence of resource blocks starting in a first frequency block assigned for use by the user device and ending in a second frequency block assigned for use by the user device. The first and second frequency blocks may be adjacent frequency blocks (e.g. without another frequency block between them) or non-adjacent (e.g. with another frequency block between them). Where the first and second frequency blocks are non-adjacent it will be appreciated that the (or each) intermediate frequency block between them may or may not be assigned to the user device and the allocated resource blocks may or may not include the resource blocks in the (or at least one) intermediate frequency block accordingly.

The first resource allocation data may comprise a frequency block assignment bit mask, and the or each frequency block may be respectively represented by at least one bit of said frequency block assignment bit mask.

The determination step for determining the at least one frequency block assigned for use by the user device may determine that a plurality of said frequency blocks are assigned for use by the user device. In the step of generating second resource allocation data, the sequence of resource blocks in each of the frequency blocks assigned for use by the user device may be treated as a concatenated sequence, and said generated resource allocation data may be arranged to indicate the position of said allocated resource blocks in said concatenated sequence.

The plurality of frequency blocks may comprise at least two non-adjacent frequency blocks. The concatenated sequence may be arranged in order of frequency.

According to another aspect of the invention there is provided a method of determining resource allocation in a communication system which uses a plurality of frequency blocks in each of which a plurality of sub-carriers are arranged in a sequence of resource blocks, the method comprising: receiving first resource allocation data identifying at least one assigned frequency block; receiving second resource allocation data identifying an allocation of resource blocks, wherein said second resource allocation data is dependent on the at least one assigned frequency block; determining the at least one assigned frequency block using the received first allocation data; and determining the allocation of resource blocks based on the received second resource allocation data and the determined at least one assigned frequency block.

The resource blocks may be grouped in a sequence of resource block groups. The sequence of resource block groups may comprise at least one allocated resource block group comprising said determined allocation of resource blocks. The second resource allocation data may be arranged for identifying the at least one allocated resource block group, thereby to identify said determined allocation of resource blocks.

The second resource allocation data may be arranged for identifying the relative position of the at least one allocated resource block group in the sequence of resource block groups.

The second resource allocation data may comprise a resource block group assignment bit mask. The or each resource block group in the at least one assigned frequency block may be respectively represented by at least one bit of the assignment bit mask.

The number of bits in said second resource block allocation data may be dependent on the number of frequency blocks assigned for use by said user device. The number of bits in said second resource block allocation data may remain the same regardless of the number of frequency blocks assigned for use by said user device.

The number of resource blocks in each resource block group may be dependent on the number of assigned frequency blocks.

The allocation of resource blocks may comprise at least one contiguous sequence of resource blocks. The second resource allocation data may comprise a value which encodes a position of a start resource block of the contiguous sequence and may comprise a value which encodes the number of resource blocks in the contiguous sequence.

The allocation of resource blocks may comprise a contiguous sequence of resource blocks in each assigned frequency block. Each contiguous sequence may comprise the same number of resource blocks. The start resource block of each contiguous sequence may have the same relative position in the frequency block in which it is located.

The allocation of resource blocks may comprise a contiguous sequence of resource blocks starting in a first assigned frequency block and ending in a second assigned frequency block.

The first resource allocation data may comprise a frequency block assignment bit mask. The or each assigned frequency block may be respectively represented by at least one bit of said frequency block assignment bit mask.

The at least one assigned frequency block may comprise a plurality of said frequency blocks. During said step of determining the allocation of resource blocks the sequence of resource blocks in each of the assigned frequency blocks may be treated as a concatenated sequence. The resource allocation data may be interpreted as indicating the position of said allocated resource blocks in said concatenated sequence.

According to another aspect of the invention there is provided a communication node which is operable to communicate with a plurality of user devices in a communication system which uses a plurality of frequency blocks in each of which a plurality of sub-carriers are arranged in a sequence of resource blocks, the communication node comprising: means for determining at least one frequency block assigned for use by a user device; means for determining an allocation of resource blocks within the at least one identified frequency block, for use by said user device; means for generating first resource allocation data identifying the at least one determined frequency block for the user device; means for generating second resource allocation data identifying the determined allocation of resource blocks for the user device, wherein said second resource allocation data is dependent on the determined at least one frequency block assigned for use by the user device; and means for signalling said first and second resource allocation data to said user device.

According to another aspect of the invention there is provided a user device which is operable to communicate with a communication node in a communication system which uses a plurality of frequency blocks in each of which a plurality of sub-carriers are arranged in a sequence of resource blocks, the user device comprising: means for receiving first resource allocation data identifying at least one assigned frequency block; means for receiving second resource allocation data identifying an allocation of resource blocks, wherein said second resource allocation data is dependent on the at least one assigned frequency block; means for determining the at least one assigned frequency block using the received first allocation data; and means for determining the allocation of resource blocks based on the received second resource allocation data and the determined at least one assigned frequency block.

According to another aspect of the invention there is provided a communication node which is operable to communicate with a plurality of user devices in a communication system which uses a plurality of frequency blocks in each of which a plurality of sub-carriers are arranged in a sequence of resource blocks, the communication node comprising: a determiner operable to determine at least one frequency block assigned for use by a user device; a determiner operable to determine an allocation of resource blocks within the at least one identified frequency block, for use by said user device; a generator operable to generate first resource allocation data identifying the at least one determined frequency block for the user device; a generator operable to generate second resource allocation data identifying the determined allocation of resource blocks for the user device, wherein said second resource allocation data is dependent on the determined at least one frequency block assigned for use by the user device; and a signaller operable to signal said first and second resource allocation data to said user device.

According to another aspect of the invention there is provided a user device which is operable to communicate with a communication node in a communication system which uses a plurality of frequency blocks in each of which a plurality of sub-carriers are arranged in a sequence of resource blocks, the user device comprising: a receiver operable to receive first resource allocation data identifying at least one assigned frequency block; a receiver operable to receive second resource allocation data identifying an allocation of resource blocks, wherein said second resource allocation data is dependent on the at least one assigned frequency block; a determiner operable to determine the at least one assigned frequency block using the received first allocation data; and a determiner operable to determine the allocation of resource blocks based on the received second resource allocation data and the determined at least one assigned frequency block.

According to another aspect of the invention there is provided a method of signalling resource allocation data in a communication system which operates over a system bandwidth comprising a plurality of frequency blocks, each frequency block having a plurality of sub-carriers arranged in a sequence of resource blocks, each having a resource block index value that is unique within the system bandwidth, the method comprising: determining, using said index values, an allocation of a contiguous sequence of resource blocks for a user device having a bandwidth corresponding to a subset of said frequency blocks; generating resource allocation data encoding the determined allocation of resource blocks for the user device, wherein said resource allocation data encodes the relative position of the contiguous sequence within the system bandwidth; and signalling said resource allocation data to the user device.

The resource allocation data may comprise a value which encodes a position of a start resource block of the contiguous sequence. The resource allocation data may comprise a value which encodes the number of resource blocks in the contiguous sequence.

The resource allocation data may comprise a value which encodes a relative position of a start resource block of the contiguous sequence in said system bandwidth and the number of resource blocks in the contiguous sequence.

The method may comprise identifying reserved resource blocks and other resource blocks, and may comprise allocating said unique index values to the other resource blocks but not to said reserved resource blocks. The method may comprise allocating said unique index values to resource blocks regardless of whether they are reserved or not.

According to another aspect of the invention there is provided a method of determining resource allocation in a communication system which operates over a system bandwidth comprising a plurality of frequency blocks, each frequency block having a plurality of sub-carriers arranged in a sequence of resource blocks, each having a resource block index value that is unique within the system bandwidth, the method comprising: receiving, at a user device having an operating bandwidth corresponding to a subset of said frequency blocks, resource allocation data encoding the determined allocation of resource blocks for the user device, wherein said resource allocation data encodes the relative position of the contiguous sequence within the system bandwidth; and determining the allocation of resource blocks within its operating bandwidth using the received resource allocation data and data mapping the relative position of the contiguous sequence within the system bandwidth onto the relative position of the contiguous sequence within the operating bandwidth of the user device.

The allocated resource blocks may comprise at least one reserved resource block. Where the allocated resource blocks comprise at least one reserved resource block the method may comprise identifying which of the allocated resource blocks are not reserved, and determining the indentified unreserved resource blocks to be allocated for use in subsequent communication with a communication node.

According to another aspect of the invention there is provided a communication node which is operable to communicate with a plurality of user devices in a communication system which operates over a system bandwidth comprising a plurality of frequency blocks, each frequency block having a plurality of sub-carriers arranged in a sequence of resource blocks, each having a resource block index value that is unique within the system bandwidth, the communication node comprising: means for determining, using said index values, an allocation of a contiguous sequence of resource blocks for a user device having a bandwidth corresponding to a subset of said frequency blocks; means for generating resource allocation data encoding the determined allocation of resource blocks for the user device, wherein said resource allocation data encodes the relative position of the contiguous sequence within the system bandwidth; and means for signalling said resource allocation data to the user device.

According to another aspect of the invention there is provided a user device which is operable to communicate with a communication node in a communication system which operates over a system bandwidth comprising a plurality of frequency blocks, each frequency block having a plurality of sub-carriers arranged in a sequence of resource blocks, each having a resource block index value that is unique within the system bandwidth, the user device having an operating bandwidth corresponding to a subset of said frequency blocks and comprising: means for receiving resource allocation data encoding the determined allocation of resource blocks for the user device, wherein said resource allocation data encodes the relative position of the contiguous sequence within the system bandwidth; and means for determining the allocation of resource blocks within its operating bandwidth using the received resource allocation data and data mapping the relative position of the contiguous sequence within the system bandwidth onto the relative position of the contiguous sequence within the operating bandwidth of the user device.

According to another aspect of the invention there is provided a communication node which is operable to communicate with a plurality of user devices in a communication system which operates over a system bandwidth comprising a plurality of frequency blocks, each frequency block having a plurality of sub-carriers arranged in a sequence of resource blocks, each having a resource block index value that is unique within the system bandwidth, the communication node comprising: a determiner operable to determine, using said index values, an allocation of a contiguous sequence of resource blocks for a user device having a bandwidth corresponding to a subset of said frequency blocks; a generator operable to generate resource allocation data encoding the determined allocation of resource blocks for the user device, wherein said resource allocation data encodes the relative position of the contiguous sequence within the system bandwidth; and a signaller operable to signal said resource allocation data to the user device.

According to another aspect of the invention there is provided a user device which is operable to communicate with a communication node in a communication node in a communication system which operates over a system bandwidth comprising a plurality of frequency blocks, each frequency block having a plurality of sub-carriers arranged in a sequence of resource blocks, each having a resource block index value that is unique within the system bandwidth, the user device having an operating bandwidth corresponding to a subset of said frequency blocks and comprising: a receiver operable to receive resource allocation data encoding the determined allocation of resource blocks for the user device, wherein said resource allocation data encodes the relative position of the contiguous sequence within the system bandwidth; and a determiner operable to determine the allocation of resource blocks within its operating bandwidth using the received resource allocation data and data mapping the relative position of the contiguous sequence within the system bandwidth onto the relative position of the contiguous sequence within the operating bandwidth of the user device.

BRIEF DESCRIPTION OF THE DRAWINGS

Embodiments of the invention will now be described by way of example only with reference to the attached figures in which.

BEST MODE FOR CARRYING OUT THE INVENTION

Overview

Figure 1:
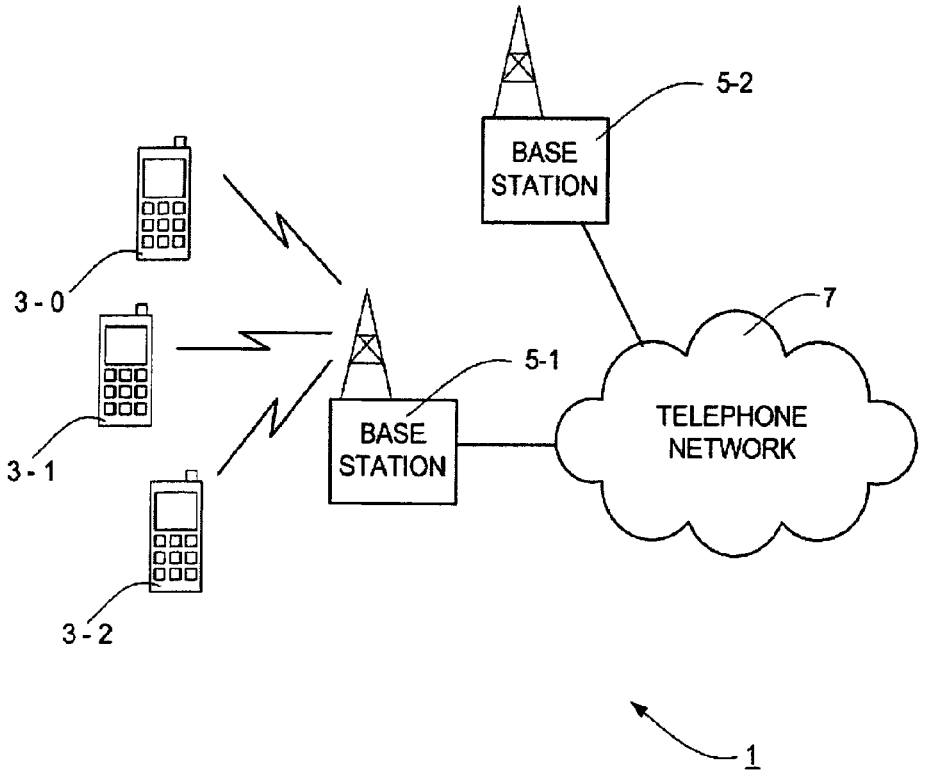
FIG. 1 schematically illustrates a mobile telecommunication system of a type to which the described embodiments are applicable.

FIG. 1 schematically illustrates a mobile (cellular) telecommunication system 1 in which users of mobile telephones 3-0, 3-1, and 3-2 can communicate with other users (not shown) via base stations 5-1, 5-2 and a telephone network 7. In this embodiment, each base station 5 uses an orthogonal frequency division multiple access (OFDMA) technique in which the data to be transmitted to the mobile telephones 3 is modulated onto a plurality of sub-carriers. Different sub-carriers are allocated to each mobile telephone 3 depending on the supported bandwidth of the mobile telephone 3 and the amount of data to be sent to the mobile telephone 3. In this embodiment each base station 5 also allocates the sub-carriers used to carry the data to the respective mobile telephones 3 in order to try to maintain a uniform distribution of the mobile telephones 3 operating across the base station's bandwidth. To achieve these goals, the base station 5 dynamically allocates sub-carriers for each mobile telephone 3 and signals the allocations for each time point (TTI) to each of the scheduled mobile telephones 3. A number of techniques are described below that perform this allocation in an efficient manner.

Base Station

Figure 2:
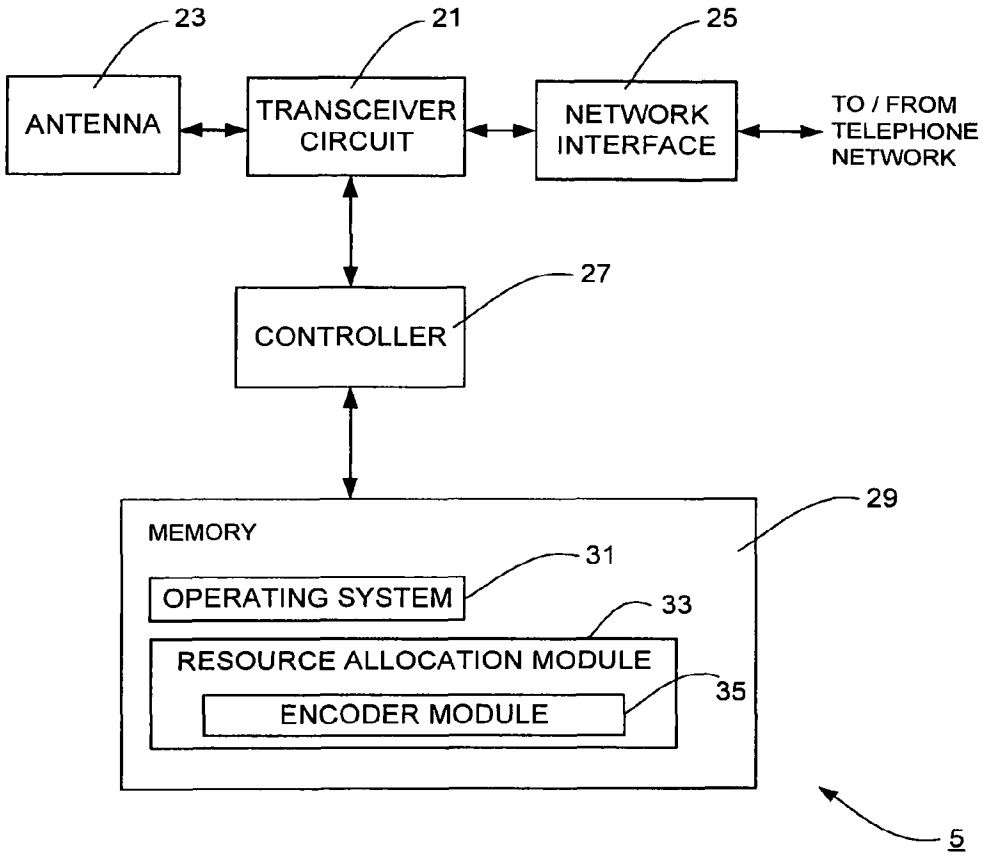
FIG. 2 schematically illustrates a base station forming part of the system shown in FIG. 1.

FIG. 2 is a block diagram illustrating the main components in each of the base stations 5 shown in FIG. 1. As shown, the base station 5 includes a transceiver circuit 21 which is operable to transmit signals to, and to receive signals from, the mobile telephones 3 via one or more antennae 23 (using the above described sub-carriers) and which is operable to transmit signals to and to receive signals from the telephone network 7 via a network interface 25. The operation of the transceiver circuit 21 is controlled by a controller 27 in accordance with software stored in memory 29. The software includes, among other things, an operating system 31 and a resource allocation module 33. The resource allocation module 33 is operable for allocating the sub-carriers used by the transceiver circuit 21 in its communications with each of the mobile telephones 3. As shown in FIG. 2, the resource allocation module 33 also includes an encoder module 35 which encodes the allocation for each mobile telephone 3 into an efficient representation which is then communicated to the respective mobile telephones 3. In a system having a large available bandwidth, such as that described with reference to FIG. 1, the signalling overheads are potentially very high. Hence, efficient encoding of the resource allocation is of particular importance for minimising these signalling overheads.

Mobile Telephone

Figure 3:
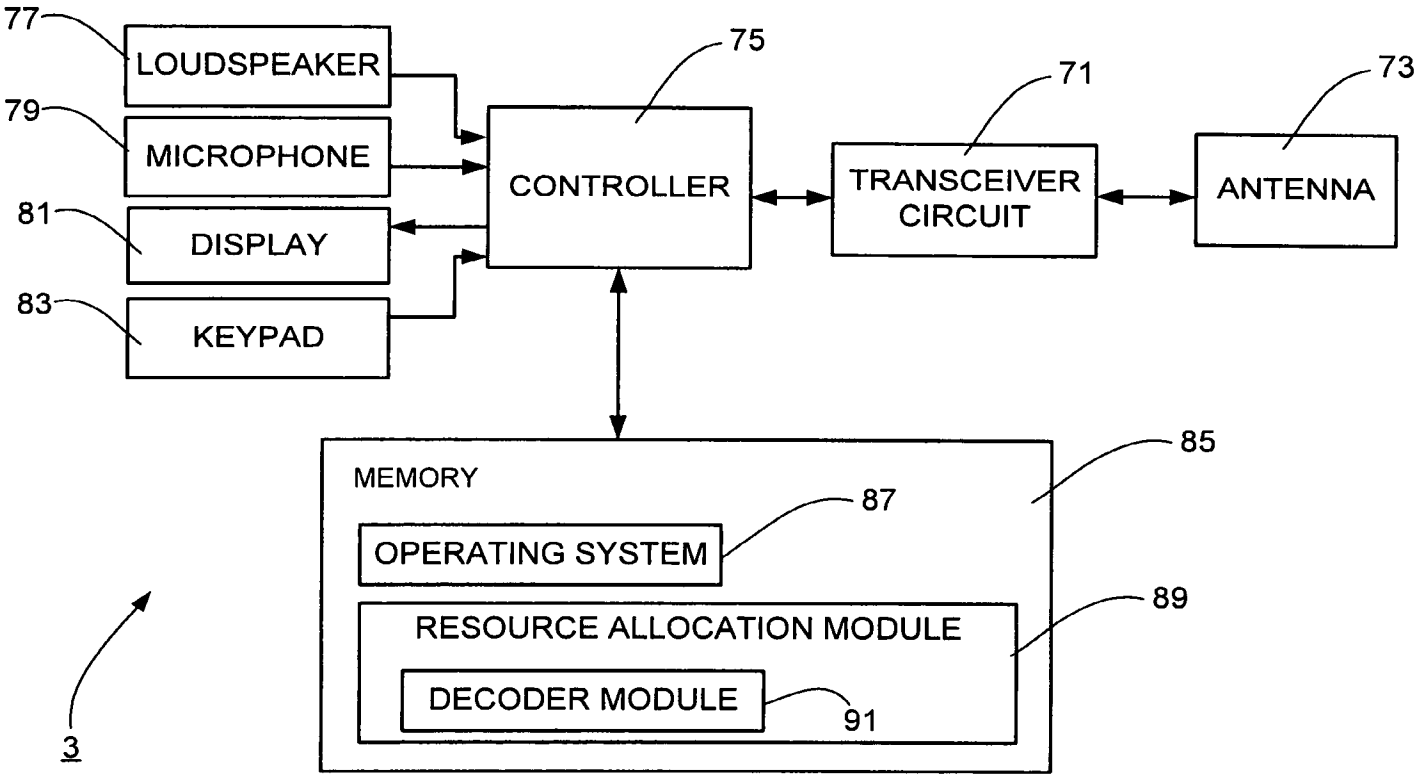
FIG. 3 schematically illustrates a mobile communication device forming part of the system shown in FIG. 1.

FIG. 3 schematically illustrates the main components of each of the mobile telephones 3 shown in FIG. 1. As shown, the mobile telephones 3 include a transceiver circuit 71 which is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87 and a communications module 89. In this embodiment, the communications module 89 includes a decoder module 91 which is operable to decode the resource allocation data signalled from the base station 5 to determine that mobile telephone's sub-carrier allocation for the current time point.

In the above description, the base station 5 and the mobile telephones 3 are described for ease of understanding as having a number of discrete modules (such as the resource allocation, encoding and decoding modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Resource Allocation

As discussed above, the purpose of the base station's resource allocation module 33 is to determine the respective sub-carriers (resources) that will be used by the different mobile telephones 3 to communicate with the base station 5. Information identifying these resources is determined and sent to each mobile telephone 3 for each transmission time interval (TTI). To perform this allocation in an efficient manner, both the base station 5 and the mobile telephones 3 are programmed with data that defines their respective operating frequency bandwidths.

In this embodiment the base stations 5 are configured to support mobile telephones 3 having a range of different maximum communications bandwidths. Specifically, in the present embodiment, the base stations 5 are configured to support mobile telephones 3 having maximum communications bandwidths in the range 20 MHz up to 100 MHz although it will be appreciated that similar techniques could be used to support other bandwidths and in particular bandwidths exceeding 100 MHz. Each telephone 3 is programmed with data identifying the available resources within its operating band.

Figure 4:
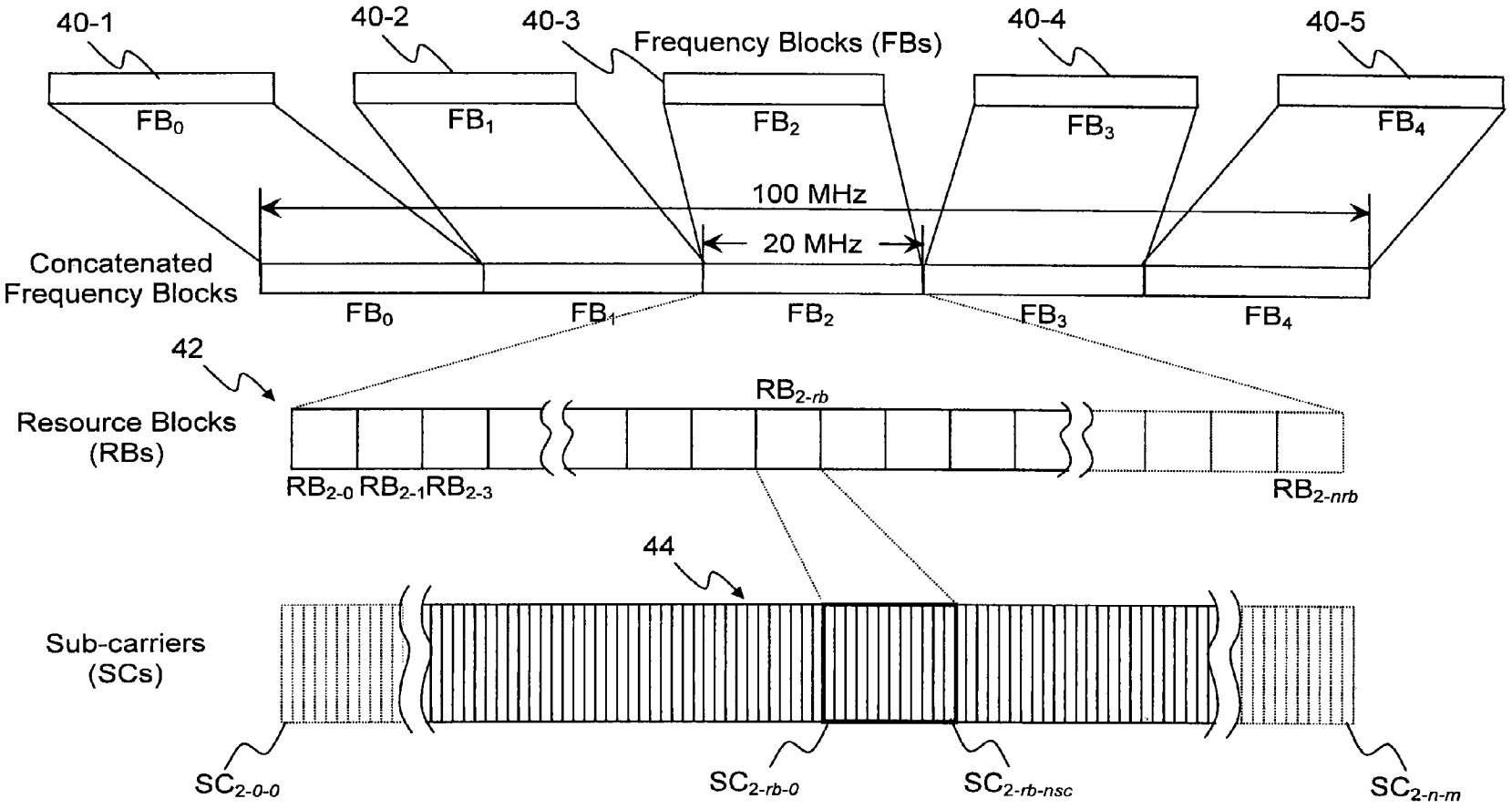
FIG. 4 illustrates the way in which frequency resources are sub-divided in the telecommunication system of FIG. 1.

FIG. 4 illustrates the available bandwidth (100 MHz in the illustrated case) for the telecommunication system 1. As shown the bandwidth is divided into a plurality of frequency blocks, 40-1, 40-2, 40-3, 40-4, 40-5 ($FB_0$-$FB_4$) each covering a frequency range substantially equivalent to the lowest supported maximum bandwidth (in this case 20 MHz). Each frequency block is subdivided into a sequence of contiguous physical resource blocks 42 ($RB_{fb\text{-}0} \ldots RB_{fb\text{-}rb} \ldots RB_{fb\text{-}nrb}$ where 'fb' is the frequency block number, 'rb' is the number of the resource block within the frequency block, and 'nrb' is one less than the number of resource blocks 42 in each frequency block) each of which may be allocated to a mobile telephone 3 in dependence on requirements. Each resource block comprises a sequence of contiguous sub-carriers 44 ($SC_{fb\text{-}rb\text{-}0} \ldots SC_{fb\text{-}rb\text{-}sc} \ldots SC_{fb\text{-}rb\text{-}nsc}$ where 'sc' is the number of the sub-carrier within the resource block, and 'nsc' is one less than the number of sub-carriers 44 in each resource block).

In the present embodiment there are 12 sub-carriers in each resource block, approximately 110 resource blocks 42 in each frequency block, and 5 frequency blocks 40 in the 100 MHz available bandwidth. It will be appreciated, however, that in other embodiments there may be any suitable number of frequency blocks 40 and that each frequency block may be delineated into resource blocks 42 and sub-carriers 44 in any suitable manner.

As shown in FIG. 4, adjacent frequency blocks may be located in physically distinct frequency bands. Some of the mobile telephones 3 will only be able to communicate in one or a subset of the frequency blocks 40 whilst others may be able to communicate in all of the frequency blocks 40. Further, when assigning resources for each mobile telephone 3, the base station 5 may allocate resources in frequency bands that are not in adjacent frequency blocks. For example a mobile telephone 3 may be allocated resources in frequency block $FB_0$ and $FB_3$.

Where the assigned frequency blocks 40 are not physically contiguous it follows that the resource blocks 42 available for allocation will not be contiguous across the boundary between the frequency blocks 40. Therefore, for the purposes of efficient resource allocation, where a mobile telephone 3 is assigned to non-contiguous frequency blocks 40, the assigned frequency blocks 40 are effectively concatenated into a sequence of virtually contiguous frequency blocks and the resource blocks 42 in those assigned frequency blocks 40 are accordingly concatenated into a virtually continuous sequence of resource blocks 42. The concatenated sequence of resource blocks 42 are implicitly indexed consecutively, starting with the resource block having the lowest frequency, and ending with the resource block having the highest frequency. As will become clear from the description below, this provides for an efficient encoding of the allocated resources for each mobile telephone 3.

Figure 5:
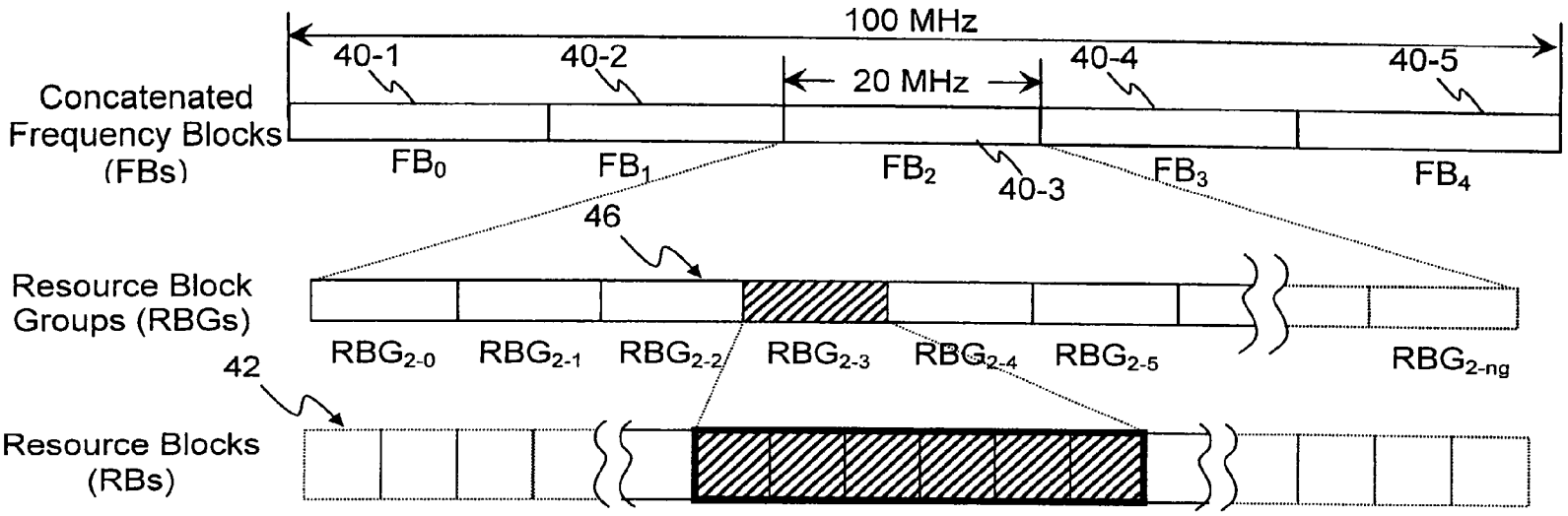
FIG. 5 illustrates the way in which the frequency resources shown FIG. 4 may be arranged in groups for efficient resource allocation.

Furthermore in order to reduce the signalling overhead required for allocating resources, in one embodiment the resource blocks 42 within each frequency block 40 may be grouped, as illustrated in FIG. 5. In particular, FIG. 5 shows that the resource blocks 42 in each frequency block may be grouped in a sequence of resource block groups 46 ($RBG_{fb\text{-}0} \ldots RBG_{fb\text{-}rbg} \ldots RBG_{fb\text{-}ng}$ where 'rbg' is the number of the resource block group in the frequency block and 'ng' is one less than the number of resource block groups 46 in each frequency block) each containing an equal number of the resource blocks 42. This allows a number of resource blocks 42 to be assigned to a mobile telephone 3 by reference to a single resource block group.

The telecommunication system 1 uses Layer 1 (L1)/Layer 2 (L2) control signalling to carry downlink and/or uplink resource allocation information corresponding to a number of frequency blocks 40. The system 1 is configured such that mobile telephones 3 having a maximum 20 MHz transmission/reception bandwidth may be scheduled onto any one of the MHz frequency blocks 40. This effectively allows the telecommunication system to be backwards compatible with older mobile telephones 3 having the lowest maximum bandwidth.

A more advanced mobile telephone 3, having a larger maximum bandwidth, can also be catered for by scheduling it onto one or more of the frequency blocks 40 depending on the communications requirement at the time, and the capability of the mobile telephone 3.

A number of different methods for efficient resource block allocation for uplink and/or downlink communications will now be described, by way of example only. In summary the methods include:

(1) Virtual Dis-contiguous Resource Block (VDRB) assignment in which a mobile telephone 3 is allocated a plurality of resource block groups 46, each comprising a sequence of contiguous resource blocks. The allocated resource block groups 46 themselves are distributed (and therefore may not be contiguous) over the transmission bandwidth of the mobile telephone 3 and may therefore be physically located in a plurality of frequency blocks 40. In this assignment method the number of bits required for signalling allocation scales with the physical downlink shared channel (PDSCH)/physical uplink shared channel (PUSCH) transmission bandwidth assigned to the mobile telephone 3 to which the resources are being allocated;

(2) Fixed-length Virtual Dis-contiguous Resource Block (FVDRB) assignment in which, like VDRB assignment, a mobile telephone 3 is allocated a plurality of resource block groups 46, each comprising a sequence of contiguous resource blocks. The allocated resource block groups 46 themselves are distributed (and therefore may not be contiguous) over the transmission bandwidth of the mobile telephone 3 and may therefore be physically located in a plurality of frequency blocks 40. However, unlike VDRB assignment, the number of bits required for signalling the allocation is fixed and therefore does not scale with the assigned PDSCH/PUSCH transmission bandwidth; and (3) Virtual Contiguous Resource Block (VCRB) assignment in which a mobile telephone 3 is allocated contiguous (or virtually contiguous) localised resource blocks which may be physically located in multiple frequency blocks 40.

The downlink/uplink resource signalling methods proposed are generally applicable both to the contiguous and the non-contiguous frequency block cases.

Virtual Dis-Contiguous Resource Block (VDRB) Assignment

Figure 6:
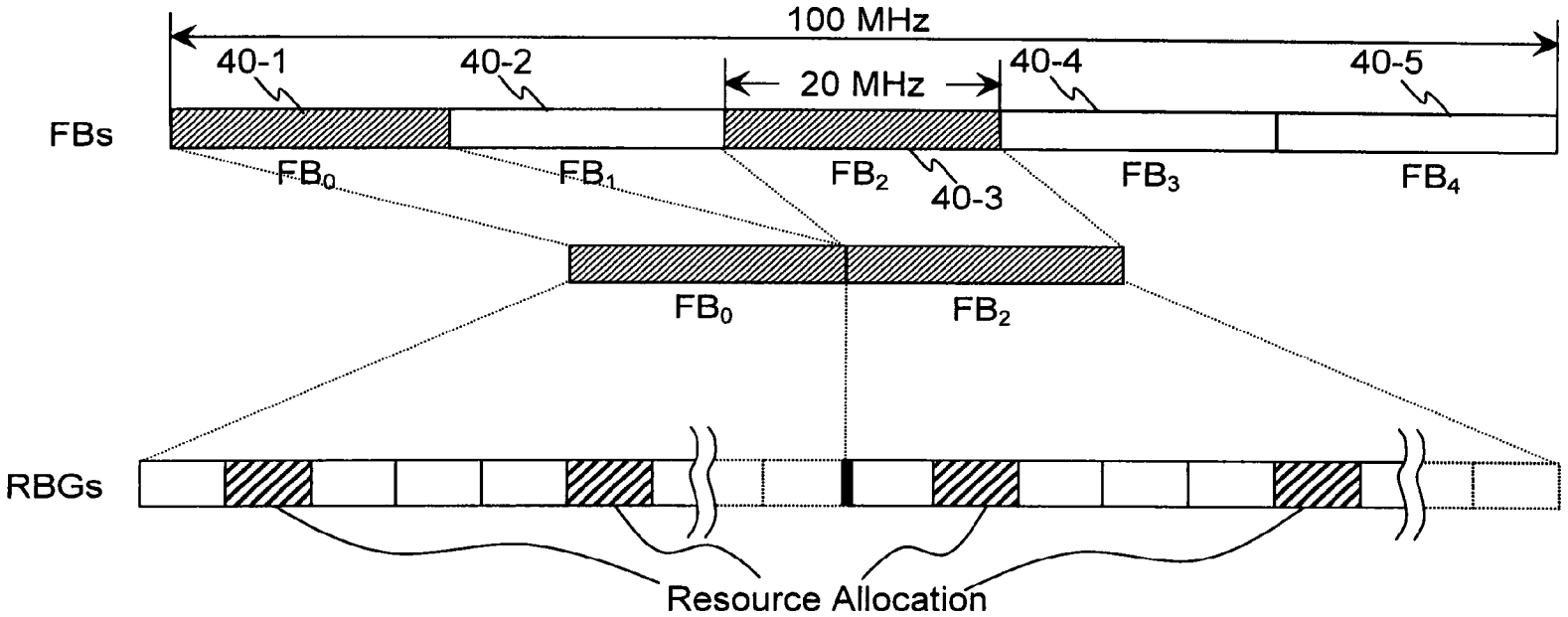
FIG. 6 illustrates an example of a resource allocation which may be encoded and signalled using a first or second resource assignment method.
Figure 7:
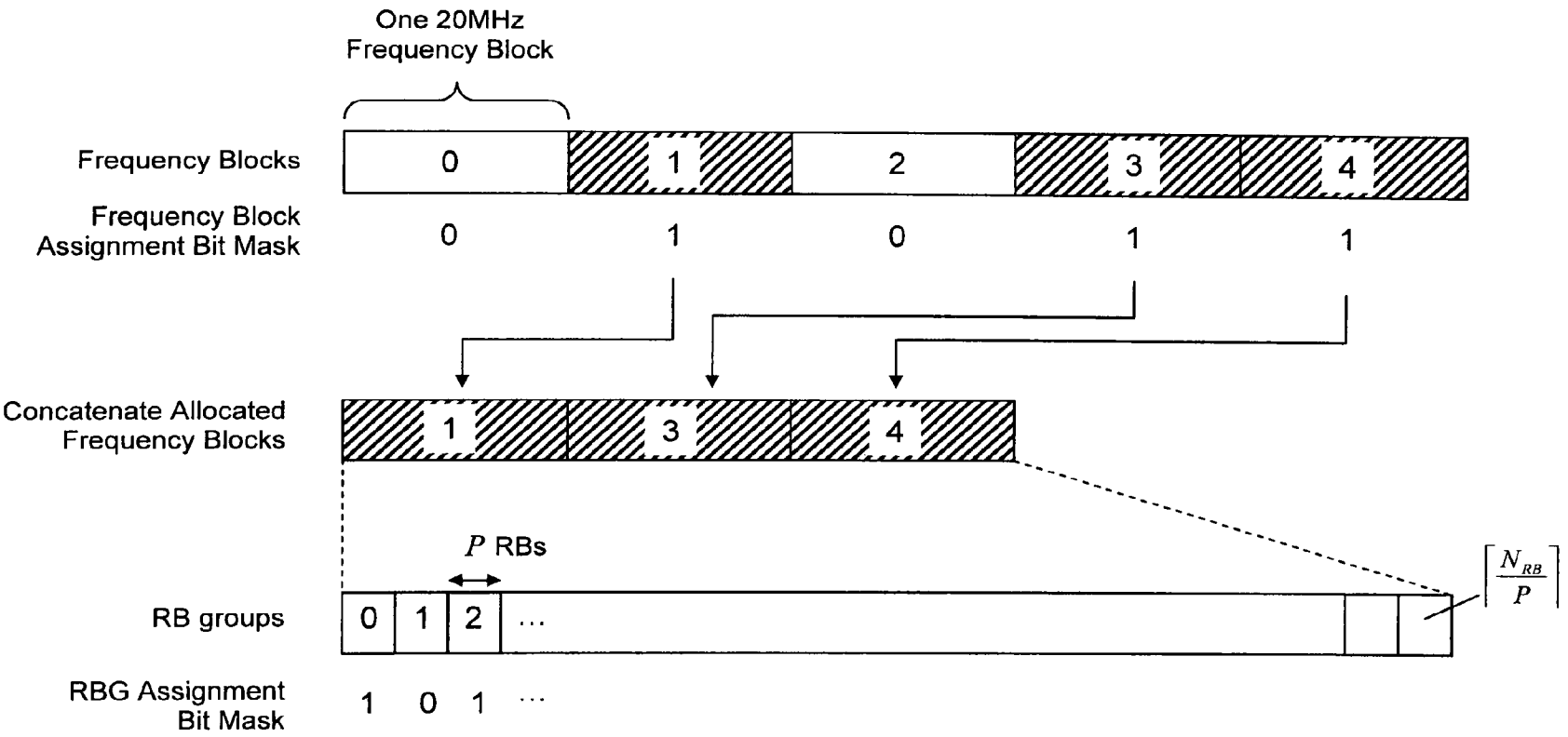
FIG. 7 illustrates another example of a resource allocation which may be encoded and signalled using the first or second resource assignment method, and also a corresponding encoding scheme.

FIGS. 6 and 7 show examples of resource allocation which may be signalled to the mobile telephone 3 using the VDRB assignment method summarised in (1) above. In the example of FIG. 6 a mobile telephone 3 has been assigned to frequency blocks 40-1 and 40-3 ($FB_0$ and $FB_2$) and in the example of FIG. 7 a mobile telephone 3 has been assigned to three frequency blocks 40-2, 40-4 and 40-5 ($FB_1$, $FB_3$ and $FB_4$). In each case, within each of the assigned frequency blocks 40 a plurality of resource block groups 46 have been allocated to the mobile telephone 3, which resource block groups 46 are distributed throughout the assigned frequency blocks.

The number of resource blocks 42 in each allocated resource block group (the resource block group size, P) is dependent on the number of frequency blocks 40 to which the mobile telephone 3 is assigned, as illustrated in Table 1. In the example shown in FIG. 6 (where 2 frequency blocks have been assigned), therefore, the size of each resource block group is 6 resource blocks and in the example of FIG. 7 (where 3 frequency blocks have been assigned), the size of each resource block group is 8 resource blocks.

TABLE 1

VDRB assignment across multiple frequency blocks

| | Number of 20 MHz frequency blocks assigned for PDSCH/PUSCH | | | | |
|---|---|---|---|---|---|
| | 1 | 2 | 3 | 4 | 5 |
| Total number of assignable RBs, $N_{RB}$ | ~110 | ~220 | ~330 | ~440 | ~550 |
| RBG size, P | 4 | 6 | 8 | 10 | 12 |
| RBG Assignment bit mask size = ceil ($N_{RB}$/P) | 28 | 37 | 42 | 44 | 46 |
| Frequency Block Assignment bit mask size | 5 | 5 | 5 | 5 | 5 |
| Total size (bits) | 33 | 42 | 47 | 49 | 51 |

The encoder module 35 of the base station 5 is configured to encode each frequency block allocated to a mobile telephone 3 for PDSCH/PUSCH transmission, into a frequency block assignment bit mask (comprising 5 bits) each bit of which represents a different frequency block. The first bit represents the first frequency block 40-1, the second bit represents the second frequency block 40-2 etc. Accordingly, during resource allocation the encoder module 35 is configured to generate a frequency block assignment bit mask pattern in which each assigned frequency block is represented as a one and each unassigned frequency block is represented as a zero (as illustrated FIG. 7) or vice versa.

The number of frequency blocks 40 allocated (i.e. the number of ones in the frequency block assignment bit mask) defines the total number of assignable resource blocks 42, '$N_{RB}$', and the resource block group size, 'P'.

The encoder module 35 of the base station 5 is also configured effectively to concatenate the $N_{RB}$ resource blocks 42 in the assigned frequency blocks and to treat them as a continuous sequence of resource blocks 42 (implicitly numbered from 0 through to $N_{RB}-1$), arranged in order of increasing frequency. The encoder module 35 is then arranged effectively to group the concatenated resource blocks into ceil ($N_{RB}$/P) resource block groups 46, where ceil(x) is the ceiling function the result of which is the smallest integer not less than x, and where each resource block group comprises 'P' resource blocks.

The encoder module 35 is then configured to encode the resource block groups 46 allocated to the mobile telephone 3 into a RBG assignment bit mask having a plurality of bits, each of which represents a different one of the resource block groups 46 in the concatenated sequence. Accordingly, the encoder module 35 generates an RBG assignment bit mask in which a one is assigned to each bit representing an allocated resource block group and a zero is assigned to each bit representing a resource block group which is not allocated to that mobile telephone 3 (as illustrated FIG. 7) or vice versa.

The base station 5 is then configured to signal the assignment bit masks (the frequency block assignment bit mask and the RBG assignment bit mask) to the mobile telephone 3, on a physical downlink control channel (PDCCH), as part of a resource allocation field in a scheduling grant.

The decoder module 91 of each mobile telephone 3 is configured in a complementary manner to the encoder module 35 of the base station 5, to decode the resource allocation field to determine which of the frequency blocks 40 it has been assigned to and which resource block groups 46 within the assigned frequency blocks have been allocated to it.

In particular, the decoder module 91 uses the frequency block assignment bit mask to identify how many and in which of the frequency blocks, resources have been allocated. The decoder module 91 then works out the total number of assignable resource blocks 42 '$N_{RB}$' and the resource block group size (P) from its pre-stored data (representing table 1 above). The decoder then effectively concatenates the assigned frequency blocks and determines from the RBG assignment bit mask which of the resource block groups 46 have been assigned to it. The result defines the resource blocks 42 (and hence the sub-carriers 44) that are assigned to the mobile telephone 3 for that time point.

As seen in Table 1, the resource block group size P increases with the number of frequency blocks 40 assigned for PDSCH/PUSCH transmission. It will be appreciated, therefore, that if the bandwidth is required to be divided with a finer granularity of frequencies then a lower number of frequency blocks 40 (with a corresponding smaller value of P) has to be allocated.

Thus, in this embodiment, the total bit width (or length) of the resource allocation field for distributed resource allocation is minimised if different downlink control information (DCI) formats are used depending on the number of frequency blocks 40 allocated. Whilst this approach minimises the number of bits that have to be signalled for a given allocation, the different possible DCI formats is disadvantageous because the mobile telephone 3 does not know what format to expect and so has to consider all possible formats to identify any allocation.

Fixed-Length Virtual Dis-Contiguous Resource Block (FVDRB) Assignment

The resource allocations in the examples of FIGS. 6 and 7 may also be signalled to the mobile telephone 3 using the FVDRB assignment method summarised in (2) above.

FVDRB allocation is similar to the VDRB allocation described above but instead of signalling the resource allocations using a different resource allocation field length for each possible number of allocated frequency blocks 40, the encoder module 35 in FVDRB is configured to generate a fixed length resource allocation field for allocations of two or more frequency blocks 40.

The advantage of this approach is that it requires just a single DCI format to signal all possible resource allocations. The use of a single DCI format therefore minimises the number of 'blind' decoding attempts that mobile telephone 3 has to perform to determine how many frequency blocks 40 it has been allocated.

Like VDRB assignment, the internal structure of the resource allocation field for FVDRB assignment is dependent on the number of allocated frequency blocks 40 as illustrated in Table 2.

TABLE 2

FVDRB assignment across multiple frequency blocks

| | Number of 20 MHz frequency blocks assigned for PDSCH/PUSCH | | | |
|---|---|---|---|---|
| | 2 | 3 | 4 | 5 |
| Total number of assignable RBs ($N_{RB}$) | ~220 | ~330 | ~440 | ~550 |
| RBG size (P) | 5 | 8 | 10 | 12 |
| RBG Assignment bit mask size, (a = ceil ($N_{RB}$/P) bits) | 44 | 42 | 44 | 46 |
| Frequency Block Assignment bit mask size (m) | 5 | 5 | 5 | 5 |
| Remainder bits (r) | 2 | 4 | 2 | 0 |
| Total size bits (y) | 51 | 51 | 51 | 51 |

As described for VDRB encoding, in the case of FVDRB encoding, the encoder module 35 of the base station 5 is configured to encode each frequency block allocated to a mobile telephone 3 for PDSCH/PUSCH transmission, into a frequency block assignment bit mask (of 5 bits) each bit of which represents a different frequency block (as illustrated FIG. 7).

Similarly, as described for VDRB encoding, the encoder module 35 of the base station 5 is also configured effectively to concatenate the resource blocks 42 in the assigned frequency blocks, to treat them as a continuous sequence of resource blocks arranged in order of increasing frequency, and to group the concatenated resource blocks into resource block groups 46. The encoder module 35 is then configured to encode the resource block groups 46 allocated to the mobile telephone 3 into a RBG assignment bit mask having a plurality of bits, each of which represents a different resource block group in the concatenated sequence.

As shown in Table 2, however, the resource block group size 'P' for the different numbers of frequency blocks 40 assigned for PDSCH/PUSCH transmission is different to that shown in Table 1 for VDRB assignment. In particular, with FVDRB the group size is optimised to make the most efficient use of the fixed number of bits available. In general for a particular required fixed bit width y, the optimum resource block group size is given by:

$$P = \text{ceil}\left(\frac{N_{RB}}{y - m}\right)$$

Where 'm' is the size of the frequency block assignment mask (5-bits in this example). The RBG assignment bit mask size is still given by:

$$a = \text{ceil}\left(\frac{N_{RB}}{P}\right)$$

Inevitably, for certain allocations this leaves a number of remainder bits which can be calculated as follows:

$$r = y - m - a$$

Where additional control fields are present in the resource assignment message, the r remainder bits may be used in those fields. Alternatively, the remainder bits can be filled with padding bits.

As described previously, the base station 5 is configured to signal the assignment bit masks to the mobile telephone 3, on a physical downlink control channel (PDCCH), as part of a resource allocation field in the scheduling grant. The decoder module 91 of each mobile telephone 3 is configured, in a complementary manner to the encoder module 35 of the base station 5, to decode the resource allocation field to determine in which of the frequency blocks 40 it has been allocated resources. The decoder module 91 then works out $N_{RB}$ and P and from this the size of the RBG assignment bit mask, which it then uses to determine which resource block groups 46 within the assigned frequency blocks 40 have been allocated to it.

Thus, in this embodiment, the total bit width (or length) of the resource allocation field for distributed resource allocation is fixed thereby allowing a single downlink control information (DCI) format to be used regardless of the number of frequency blocks 40 allocated to the mobile telephone 3.

Virtual Contiguous Resource Block (VCRB) Assignment

Figure 8:
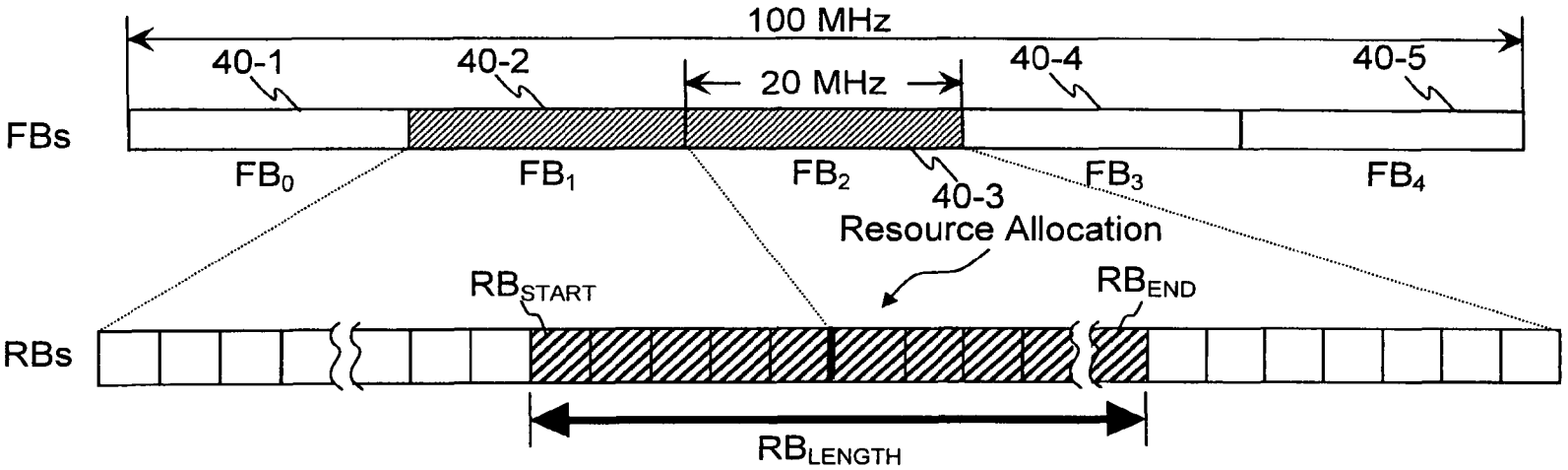
FIG. 8 illustrates an example of a resource allocation which may be encoded and signalled using a third resource assignment method.

FIG. 8 shows an example of resource allocation according to the VCRB assignment method summarised in (3) above. In the example of FIG. 8 a mobile telephone 3 has been assigned to adjacent frequency blocks 40-2 and 40-3 ($FB_1$ and $FB_2$) (assigned for example using a frequency block assignment bit mask as described above). Within the assigned frequency blocks a resource block group comprising a virtually contiguous sequence of resource blocks has been allocated to the mobile telephone 3. The virtually contiguous sequence spans the two frequency blocks to which the mobile telephone 3 is assigned.

The encoder module 35 of the base station 5 is configured effectively to concatenate the $N_{RB}$ assignable resource blocks 42 in the assigned frequency blocks and to treat them as a continuous sequence of resource blocks (numbered from 0 through to $N_{RB}-1$), arranged and implicitly numbered in order of increasing frequency. The allocated resource block sequence in FIG. 8 can thus be fully defined by the implicit index number of its start block ($RB_{START}$) in the concatenated sequence and its length ($RB_{LENGTH}$) in terms of number of resource blocks. Therefore, in this embodiment, the encoder module 35 of the base station 5 is configured to encode the index number of the start block ($RB_{START}$) and the length of the allocated sequence ($RB_{LENGTH}$) into a single integer 'k' as follows:

$$\text{if}(RB_{LENGTH}-1) \le \text{floor}\left(\frac{N_{RB}}{2}\right)$$

$$\text{then } k = N_{RB}(RB_{LENGTH}-1) + RB_{START}$$

$$\text{else } k = N_{RB}(N_{RB}-(RB_{LENGTH}-1)) + (N_{RB}-1-RB_{START})$$

(floor(x) is the floor function the result of which is the largest integer not greater than x)

The encoded integer 'k' can thus be signalled o the mobile telephone 3 using significantly fewer bits than if the allocation were encoded as a bitmap.

Conversely, the decoder module 91 of the mobile telephone 3 is configured to extract the index number of the start block and the length of the allocated sequence based on the following functions:

where:

$$a = \text{floor}\left(\frac{k}{N_{RB}}\right) + 1$$

and: $b = k \bmod N_{RB}$ if $(a+b) > N_{RB}$ then $RB_{LENGTH} = N_{RB}+2-a$ and $RB_{START} = N_{RB}-1-b$ else: $RB_{LENGTH} = a$ and $RB_{START} = b$ The encoded integer 'k' thus contains all the information required for the mobile telephone 3 to determine which resource blocks 42 have been allocated to it.

By way of example, Table 3 illustrates a selection of the typical values of 'k', which may be used to encode different values of $RB_{START}$ and $RB_{LENGTH}$ where the number of assignable resource blocks 42 $N_{RB}$ is assumed to be 220.

TABLE 3

Typical 'k' values for VCRB assignment (assuming $N_{RB} = 220$)

| | Allocation Size ($RB_{LENGTH}$) | | | | | | | | | | | |
|---|---|---|---|---|---|---|---|---|---|---|---|---|
| $RB_{START}$ | 2 | 3 | 4 | . . . | 20 | 21 | 22 | . . . | 108 | 109 | 110 | 111 |
| 0 | 220 | 440 | 660 | . . . | 4180 | 4400 | 4620 | . . . | 23540 | 23760 | 23980 | 24200 |
| 1 | 221 | 441 | 661 | . . . | 4181 | 4401 | 4621 | . . . | 23541 | 23761 | 23981 | 24201 |
| 2 | 222 | 442 | 662 | . . . | 4182 | 4402 | 4622 | . . . | 23542 | 23762 | 23982 | 24202 |
| 3 | 223 | 443 | 663 | . . . | 4183 | 4403 | 4623 | . . . | 23543 | 23763 | 23983 | 24203 |
| 4 | 224 | 444 | 664 | . . . | 4184 | 4404 | 4624 | . . . | 23544 | 23764 | 23984 | 24204 |
| . . . | . . . | . . . | . . . | . . . | . . . | . . . | . . . | . . . | . . . | . . . | . . . | . . . |
| 50 | 270 | 490 | 710 | . . . | 4230 | 4450 | 4670 | . . . | 23590 | 23810 | 24030 | 24250 |
| 51 | 271 | 491 | 711 | . . . | 4231 | 4451 | 4671 | . . . | 23591 | 23811 | 24031 | 24251 |
| 52 | 272 | 492 | 712 | . . . | 4232 | 4452 | 4672 | . . . | 23592 | 23812 | 24032 | 24252 |
| 53 | 273 | 493 | 713 | . . . | 4233 | 4453 | 4673 | . . . | 23593 | 23813 | 24033 | 24253 |
| 54 | 274 | 494 | 714 | . . . | 4234 | 4454 | 4674 | . . . | 23594 | 23814 | 24034 | 24254 |
| 55 | 275 | 495 | 715 | . . . | 4235 | 4455 | 4675 | . . . | 23595 | 23815 | 24035 | 24255 |
| 56 | 276 | 496 | 716 | . . . | 4236 | 4456 | 4676 | . . . | 23596 | 23816 | 24036 | 24256 |
| 57 | 277 | 497 | 717 | . . . | 4237 | 4457 | 4677 | . . . | 23597 | 23817 | 24037 | 24257 |
| 58 | 278 | 498 | 718 | . . . | 4238 | 4458 | 4678 | . . . | 23598 | 23818 | 24038 | 24258 |
| 59 | 279 | 499 | 719 | . . . | 4239 | 4459 | 4679 | . . . | 23599 | 23819 | 24039 | 24259 |
| 60 | 280 | 500 | 720 | . . . | 4240 | 4460 | 4680 | . . . | 23600 | 23820 | 24040 | 24260 |
| . . . | . . . | . . . | . . . | . . . | . . . | . . . | . . . | . . . | . . . | . . . | . . . | . . . |
| 108 | 328 | 548 | 768 | . . . | 4288 | 4508 | 4728 | . . . | 23648 | 23868 | 24088 | 24308 |
| 109 | 329 | 549 | 769 | . . . | 4289 | 4509 | 4729 | . . . | 23649 | 23869 | 24089 | 24309 |
| 110 | 330 | 550 | 770 | . . . | 4290 | 4510 | 4730 | . . . | 23650 | 23870 | 24090 | N/A |
| 111 | 331 | 551 | 771 | . . . | 4291 | 4511 | 4731 | . . . | 23651 | 23871 | N/A | N/A |

The number of independent values of the integer k required to encode any contiguous allocated sequence within the concatenated sequence of $N_{RB}$ assignable resource blocks 42 is equal to $N_{RB}(N_{RB}+1)/2$. Hence, any contiguous allocated sequence within the concatenated sequence may be signalled using $\log_2(N_{RB}(N_{RB}+1)/2)$ bits without needing a lookup table (although it will be appreciated that this does not preclude use of such a table).

Thus, by using this encoding technique, the theoretical minimum number of bits required for signalling a contiguous resource allocation can be estimated for different bandwidths as follows (where each frequency block is assumed to be 20 MHz):

(a) 13 bits for 20 MHz (1×20 MHz bandwidth) and $N_{RB}$~110RBs (b) 15 bits for 40 MHz (2×20 MHz bandwidth) and $N_{RB}$~220RBs (c) 16 bits for 60 MHz (3×20 MHz bandwidth) and $N_{RB}$~330RBs (d) 17 bits for 80 MHz (4×20 MHz bandwidth) and $N_{RB}$~440RBs (e) 18 bits for 100 MHz (5×20 MHz bandwidth) for $N_{RB}$~550RBs However, in order to avoid the need for different DCI formats and to reduce the number of blind decoding attempts, the encoder module 35 is configured to generate a fixed-size resource allocation field for allocations where the allocated resource blocks 42 span two or more frequency blocks 40. When generating the encoded integer the value of $N_{RB}$ used by the encoder module 35 is the number of assignable resource blocks 42 across all five frequency blocks 40 (~550). This ensures that all possible virtually contiguous resource block allocations in any combination of adjacent frequency blocks 40 can be encoded using a single value of 'k'. Thus, in the fixed-length resource allocation field, the 18 bits referred to in (e) above are always used to encode the resource allocation regardless of the actual assigned bandwidth. Signalling using the fixed-length resource allocation field also allows the allocation to be signalled without requiring the assignment of frequency blocks to be signalled separately (for example, in a frequency block allocation bit mask).

It will be appreciated that some resource blocks 42 may be reserved and may not therefore be available for use by the mobile telephone 3 for the PDSCH or PUSCH. For example, in the uplink, resource blocks may be reserved for the physical uplink control channel (PUCCH), and are therefore not available for PUSCH transmission.

In one embodiment this situation is addressed by the encoder module 35 being configured to exclude the resource blocks reserved for the PUCCH channels from the resource block numbering in the concatenated sequence (i.e. PUCCH resource blocks are not counted) and thus $N_{RB}$ represents only the potential resources available for the PUSCH channel. In such an embodiment, the decoder module 91 is configured, in a complementary manner, to exclude any resource blocks 42 reserved for the PUCCH channels when deriving the allocated resource blocks from the extracted $RB_{START}$ value and $RB_{LENGTH}$.

In another embodiment the resource blocks 42 used for the PUCCH channels are not excluded from the RB numbering, but instead the mobile telephone 3 is configured effectively to ignore any PUCCH resource blocks within the allocation signalled by the base station 5 so that it does not attempt to use them for PUSCH transmissions.

Figure 9:
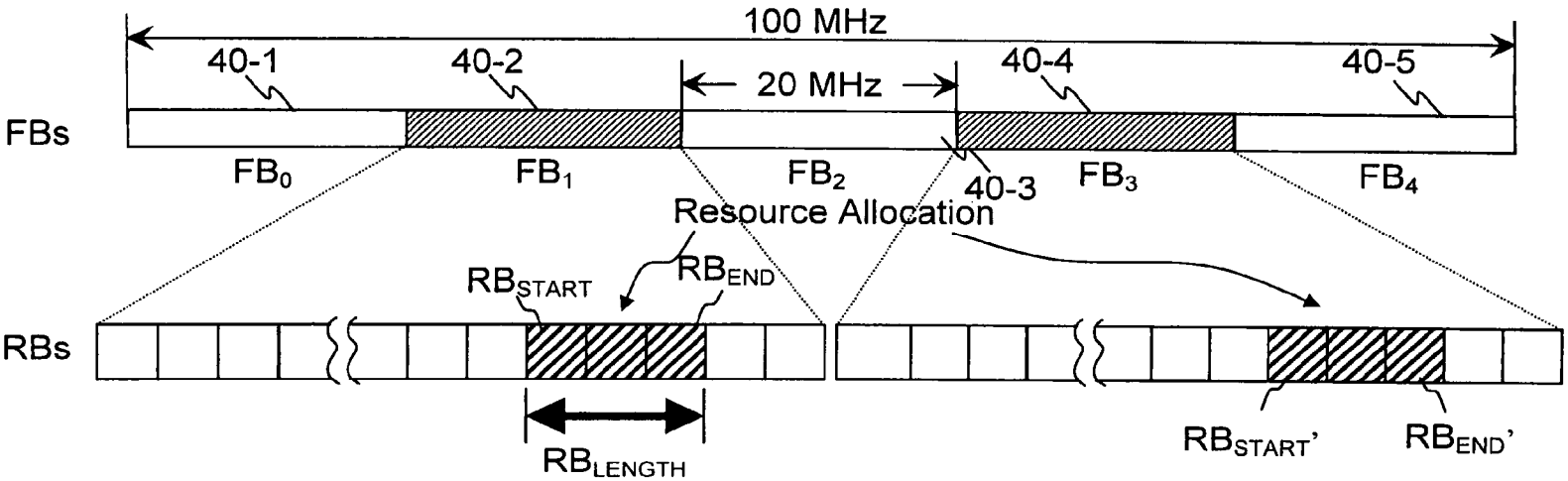
FIG. 9 illustrates an example of a resource allocation which may be encoded and signalled using a variation of the third resource assignment method.

FIG. 9 shows another example of resource allocation which may be signalled using a variation on the VCRB assignment method described with reference to FIG. 8. In the example of FIG. 9 a mobile telephone 3 has been assigned to non-adjacent frequency blocks (in this case $FB_1$ and $FB_3$). Within each assigned frequency block a resource block group comprising a contiguous sequence of resource blocks has been allocated to the mobile telephone 3. Each of the two allocated contiguous sequences is of equal length ($RB_{LENGTH}$) and the first block in each sequence has the same relative position relative to the first resource block in its respective frequency block ($RB_{START}$/$RB_{START}'$).

In this embodiment the encoder module 35 of the base station 5 is configured to encode each frequency block allocated to a mobile telephone 3 into a frequency block assignment bit mask, each bit of which represents a different frequency block (as described above with reference to FIG. 7). The encoder module 35 is also configured to encode the relative position ($RB_{START}$/$RB_{START}'$) and length ($RB_{LENGTH}$) of each allocated sequence of resource blocks as a 13 bit encoded integer 'k' as described previously for the VCRB assignment method. 13 bits is sufficient for encoding 'k' because the size and relative position of the allocated resource blocks in each assigned frequency block is the same and therefore 'k' is only required to represent the resource allocation within a single 20 MHz frequency block. The total number of bits required to signal the allocation is therefore 18 (comprising 5. bits for the frequency block assignment mask and 13 bits for the encoded value 'k').

The decoder module 91 in the mobile telephone 3 is configured, in a complementary manner to the encoder module 35, to determine the frequency blocks 40 to which it is assigned from the frequency block assignment bit mask, and the size and relative position of the contiguous sequence of allocated resource blocks in each assigned frequency block from the value of 'k' as described previously.

Figure 10:
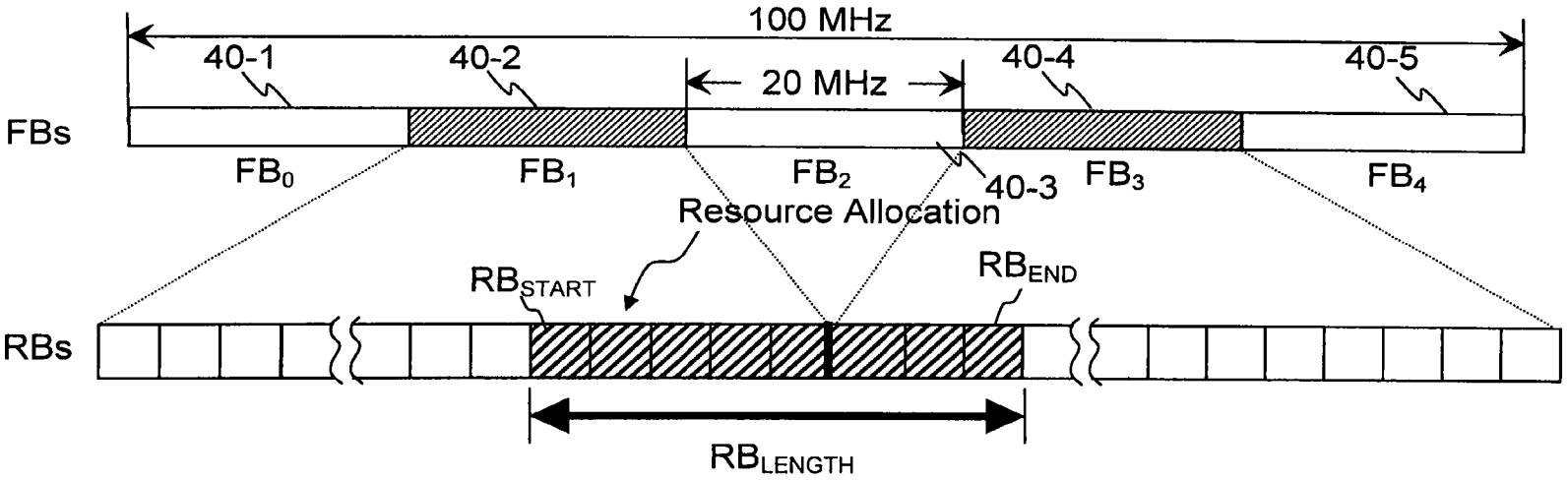
FIG. 10 illustrates an example of a resource allocation which may be encoded and signalled using a further variation of the third resource assignment method.

FIG. 10 shows yet another example of resource allocation which may be signalled using a variation on the VCRB assignment method described with reference to FIG. 9. Like in FIG. 9, in the example of FIG. 10 a mobile telephone 3 has been assigned to non-adjacent frequency blocks (in this case $FB_1$ and $FB_3$). However, in FIG. 10 the allocated resource blocks comprise a contiguous sequence of resource blocks which span the interface between the assigned frequency blocks when they are concatenated. The contiguous sequence thus has a length ($RB_{LENGTH}$) which is equal to the total number of allocated blocks across the two frequency blocks. The first block in the sequence has an implicit index number ($RB_{START}$) in the lowest frequency assigned frequency block (in this case $FB_1$).

In this embodiment the encoder module 35 of the base station 5 is configured to encode each frequency block allocated to a mobile telephone 3 into a frequency block assignment bit mask, each bit of which represents a different frequency block (as described above with reference to FIG. 7). The encoder module 35 is also configured to concatenate the assignable resource blocks in the assigned frequency blocks and to encode the position ($RB_{START}$) and length ($RB_{LENGTH}$) of the allocated sequence of resource blocks as an encoded integer C as described previously. In this case, the number of bits required for encoding 'k' will depend on the number of frequency blocks 40 to which the mobile telephone 3 is assigned as described previously.

The decoder module 91 in the mobile telephone 3 is configured, in a complementary manner to the encoder module 35, to determine the frequency blocks 40 to which it is assigned from the frequency block assignment bit mask, and to determine the size and relative position of the contiguous sequence of allocated resource blocks in each assigned frequency block from the value of 'k' as described previously.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above embodiment, a mobile telephone 3 based telecommunications system was described. As those skilled in the art will appreciate, the signalling, encoding and decoding techniques described in the present application can be employed in any communications system. In particular, many of these techniques can be used in wire or wireless based communications systems which either use electromagnetic signals or acoustic signals to carry the data. In the general case, the base stations 5 and the mobile telephones 3 can be considered as communications nodes or devices which communicate with each other. Other communications nodes or devices may include user devices such as, for example, personal digital assistants, laptop computers, web browsers, etc.

In the above embodiments, a number of modules were described. As those skilled will appreciate, these modules may be software modules which may be provided in compiled or un-compiled form and may be supplied to the base station 5 or to the mobile telephone 3 as a signal over a computer network, or on a recording medium. Further, the functionality performed by part or all of these modules may be performed using one or more dedicated hardware circuits. However, the use of software modules is preferred as it facilitates the updating of base station 5 and the mobile telephones 3 in order to update their functionalities.

Various other modifications will be apparent to those skilled in the art and will not be described in further detail here.

The following is a detailed description of the way in which the present inventions may be implemented in the currently proposed 3GPP LTE-Advanced standard. Whilst various features are described as being essential or necessary, this may only be the case for the proposed 3GPP standard, for example due to other requirements imposed by the standard. These statements should not, therefore, be construed as limiting the present invention in any way.

Introduction

LTE-Advanced will require L1/L2 control signalling to carry both downlink and uplink resource allocation information corresponding to a number of frequency blocks where each frequency block is backward compatible so that LTE terminals can be scheduled to any one of the frequency blocks. However, LTE-Advanced terminals can be scheduled from one-to-all of the frequency blocks based on their capabilities. Therefore, for LTE-Advanced system with such large bandwidth, the signalling overhead reduction is very demanding, more specifically the resource allocation is the most critical field that needs to be drastically reduced.

In this contribution, we propose three methods of signalling downlink and uplink resource block allocations as follows:

Virtual Contiguous Resource Block assignments (VCRBs): A UE can be assigned to contiguous localized RBs that can be physically located on multiple frequency blocks.

Virtual Dis-contiguous Resource Block assignments (VDRBs): A UE can be assigned to a multiple of discontinuous RB groups that can be physically located on multiple frequency blocks where each RB group is a certain number of contiguous resource blocks. However, the number of bits scales with the UE capability and its assigned PDSCH/PUSCH transmission bandwidth.

Fixed-length Virtual Dis-contiguous Resource Block assignments (FVDRBs): A UE can be assigned to multiple discontinuous RB groups that can be physically located on multiple frequency blocks where each RB group is a certain number of contiguous resource blocks. However, the number of bits are fixed and do not scale with the UE capability and its assigned PDSCH/PUSCH transmission bandwidth.

The DL/UL resource signalling methods that are proposed in this contribution are applicable to both the contiguous and non-contiguous frequency block cases.

Method 1: Virtual Contiguous Resource Block Assignment (VCRBs)

In Rel'8 LTE, a method for contiguous resource block allocation was standardised, for both downlink and uplink resource assignment, by which the UE can be assigned to a number of consecutive resource blocks. The method: called enhanced tree structure where a triangular tree structure is constructed with the number of resource blocks (RBs) available for any bandwidth equal to the number of leaf nodes. The number of nodes of the tree structure equals to $N_{RB}(N_{RB}+1)/2$ and any one of the nodes can be signalled using ceil $(\log_2(N_{RB}*(N_{RB}+1)/2))$ bits which represents a starting RB and a number of consecutive RBs. The method is further incorporated with a simple encoding and decoding scheme that do not require a lookup table.

In LTE-Advanced, an improved tree structure method can be applied by introducing the concept of virtual contiguous resource blocks (VCRBs). In some cases, frequency blocks are not physically contiguous, but they can be assumed to be virtually continuous by just concatenating the number of RBs contained in all the configured frequency blocks. The RB numbering starts from bottom-up (from the lowest to the highest frequency block) in the assigned transmission bandwidth.

By using the improved tree structure method, the number of bits for different bandwidths can be estimated as follows by assuming each frequency block to be 20 MHz:

a) 13 bits for 20 MHz (1×20 MHz bandwidth) and $N_{RB}$~110RBs
b) 15 bits for 40 MHz (2×20 MHz bandwidth) and $N_{RB}$~220RBs
c) 16 bits for 60 MHz (3×20 MHz bandwidth) and $N_{RB}$~330RBs
d) 17 bits for 80 MHz (4×20 MHz bandwidth) and $N_{RB}$~440RBs
e) 18 bits for 100 MHz (5×20 MHz bandwidth) for $N_{RB}$~550RBs In the uplink, some RBs will be reserved for PUCCH, and are therefore not available for PUSCH transmission. There are two ways to handle this:

a) RBs used for PUCCH channels are excluded in the RB numbering (i.e. PUCCH RBs are not counted) and $N_{RB}$ represents only the available resources for PUSCH channel.
b) RBs used for PUCCH channels are included in the RB numbering, but it is understood that any PUCCH RBs within the allocation signalled by the eNB are not used PUSCH transmission at the UE.

In order to avoid different DCI formats and also reduce the number of blind decoding attempts, it is then desirable have a fixed-size resource allocation field for all allocations of two or more frequency blocks, therefore 18 bits is simply enough for LTE-A system as in e) above.

Method 2: Virtual Dis-Contiguous Resource Block Assignment (VDRBs)

Virtual Dis-contiguous resource blocks (VDRBs) can be introduced by concatenating the RBs contained in all the allocated frequency blocks, and then applying a bit-map allocation method. An example is shown in Table 1.

TABLE 1

VDRBs assignment across multiple frequency blocks

| | Number of 20 MHz frequency blocks assigned for PDSCH/PUSCH | | | | |
|---|---|---|---|---|---|
| | 1 | 2 | 3 | 4 | 5 |
| Total of assignable RBs, $N_{RB}$ RBG size, P | ~110 | ~220 | ~330 | ~440 | ~550 |
| | 4 | 6 | 8 | 10 | 12 |
| RBG Assignment bit mask size = ceil ($N_{RB}$/P) | 28 | 37 | 42 | 44 | 46 |
| Frequency Block Assignment bit mask size | 5 | 5 | 5 | 5 | 5 |
| Total size (bits) | 33 | 42 | 47 | 49 | 51 |

The Frequency Block Assignment bit mask consists of one bit per frequency block and identifies which frequency blocks are allocated to the UE for PDSCH/PUSCH transmission. The number of frequency blocks allocated (i.e. the number of ones in the bit mask) defines the total number of assignable RBs, $N_{RB}$, and the RBG size, P. The $N_{RB}$ RBs in the allocated frequency blocks are numbered from 0 to $N_{RB}-1$ from lowest to highest frequency, and grouped into ceil ($N_{RB}$/P) RB groups where one RB group consists of P RBs. The RBG Assignment bit mask contains one bit for each RB group, and indicates which RB groups are allocated. An example is shown in the following example.

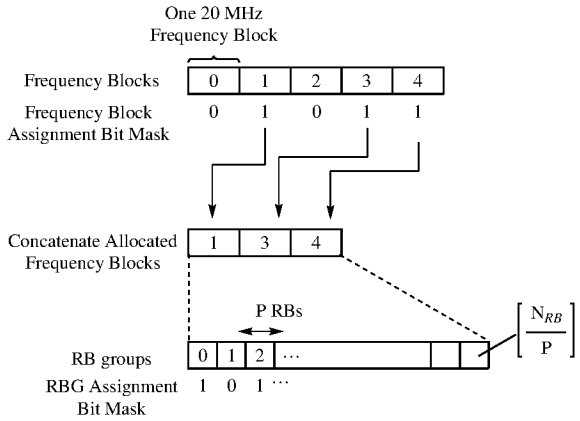

In Table 1, the RB group size P increases with the number of frequency blocks. It is assumed that if finer granularity is required then a lower number of frequency blocks (with a corresponding smaller value of P) will be allocated.

Method 3: Fixed-Length Virtual Dis-Contiguous RB Assignment (FVDRBs)

The disadvantage of Method 2 is that the total bit width of the resource allocation field depends on the number of assigned frequency blocks, which implies that a different DCI format is needed for each case. Since the UE does not know how many frequency blocks it will be allocated for PDSCH/PUSCH, it must make a blind decoding attempt for each case. To reduce the number of blind decoding attempts, an alternative is to use a fixed-length resource allocation field (i.e. a single DCI format) for all allocations of two or more frequency blocks. The format of the field depends on the number of allocated frequency blocks. An example is shown in Table 2 below:

TABLE 2

FVDRBs assignment across multiple frequency blocks

| | Number of 20 MHz frequency blocks assigned for PDSCH/PUSCH | | | |
|---|---|---|---|---|
| | 2 | 3 | 4 | 5 |
| Total number of assignable PRBs ($N_{RB}$) | ~220 | ~330 | ~440 | ~550 |
| RBG size (P) | 5 | 8 | 10 | 12 |
| RBG Assignment bit mask size, (a = ceil ($N_{RB}$/P) bits) | 44 | 42 | 44 | 46 |
| Frequency Block Assignment bit mask size (m) | 5 | 5 | 5 | 5 |
| Remainder bits (r) | 2 | 4 | 2 | 0 |
| Total size bits (y) | 51 | 51 | 51 | 51 |

It can be seen that regardless of the number of allocated frequency blocks, each LTE-Advanced UE monitors a fixed-length resource allocation field that has a constant number of bits (i.e. 51 bits in the above example).

In general, for any required total size y, the size of each field can be calculated as follows.

$$P = \text{ceil}\left(\frac{N_{RB}}{y-m}\right)$$

$$a = \text{ceil}\left(\frac{N_{RB}}{P}\right)$$

$$r = y - m - a$$

If additional control fields are present in the resource assignment message then it may be possible to use the r remainder bits in those fields. Otherwise they can simply be filled with padding bits.

CONCLUSIONS

In this contribution, we have described three methods for signalling downlink and uplink resource block allocations. Method 1 is very efficient for only contiguous localised resource allocations. Method 3 is very efficient for discontinuous RB group allocations. Hence, we propose Method 1 and Method 3 to be adopted for LTE-Advanced DL/UL resource.

This application is based upon and claims the benefit of priority from United Kingdom Patent Application No. 0820109.7, filed on Nov. 3, 2008, the disclosure of which is incorporated herein in its entirety by reference.

The invention claimed is:

[1. A method of signalling resource allocation data in a communication system which uses a plurality of frequency blocks in each of which a plurality of sub-carriers are arranged in a sequence of resource blocks, the method comprising:

determining at least one frequency block assigned for use by a user device;

determining an allocation of resource blocks within the at least one identified frequency block, for use by said user device;

generating first resource allocation data identifying the at least one determined frequency block for the user device;

generating second resource allocation data identifying the determined allocation of resource blocks for the user device, wherein said second resource allocation data is dependent on the determined at least one frequency block assigned for use by the user device; and signalling said first and second resource allocation data to said user device.]

[2. A method as claimed in claim 1, wherein said resource blocks are grouped in a sequence of resource block groups;

wherein said sequence of resource block groups comprises at least one allocated resource block group comprising said determined allocation of resource blocks;

and wherein said second resource allocation data is arranged for identifying the at least one allocated resource block group, thereby to identify said determined allocation of resource blocks.]

[3. A method as claimed in claim 2, wherein said second resource allocation data is arranged for identifying the relative position of the at least one allocated resource block group in said sequence of resource block groups.]

[4. A method as claimed in claim 2, wherein said second resource allocation data comprises a resource block group assignment bit mask, and wherein the or each resource block group in said determined at least one frequency block is respectively represented by at least one bit of said assignment bit mask.]

[5. A method as claimed in claim 2, wherein the number of bits in said second resource block allocation data is dependent on the number of frequency blocks assigned for use by said user device.]

[6. A method as claimed in claim 2, wherein the number of bits in said second resource block allocation data remains the same regardless of the number of frequency blocks assigned for use by said user device.]

[7. A method as claimed in claim 2, wherein the number of bits in said second resource block allocation data remains the same regardless of the number of frequency blocks assigned for use by said user device.]

[8. A method as claimed in claim 1, wherein said allocation of resource blocks comprises at least one contiguous sequence of resource blocks, and wherein said second resource allocation data comprises a value which encodes a position of a start resource block of the contiguous sequence and the number of resource blocks in the contiguous sequence.]

[9. A method as claimed in claim 8, wherein said allocation of resource blocks comprises at least one contiguous sequence of resource blocks, and wherein said second resource allocation data comprises a value which encodes a position of a start resource block of the contiguous sequence and the number of resource blocks in the contiguous sequence.]

[10. A method as claimed in claim 8, wherein said allocation of resource blocks comprises at least one contiguous sequence of resource blocks, and wherein said second resource allocation data comprises a value which encodes a position of a start resource block of the contiguous sequence and the number of resource blocks in the contiguous sequence.]

[11. A method as claimed in claim 1, wherein said first resource allocation data comprises a frequency block assignment bit mask, and wherein the or each frequency block is respectively represented by at least one bit of said frequency block assignment bit mask.]

[12. A method as claimed in claim 1, wherein said determining the at least one frequency block assigned for use by the user device determines that a plurality of said frequency blocks are assigned for use by the user device; and wherein in said generating second resource allocation data, the sequence of resource blocks in each of the frequency blocks assigned for use by the user device are treated as a concatenated sequence, and said generated resource allocation data is arranged to indicate the position of said allocated resource blocks in said concatenated sequence.]

[13. A method of determining resource allocation in a communication system which uses a plurality of frequency blocks in each of which a plurality of sub-carriers are arranged in a sequence of resource blocks, the method comprising:

receiving first resource allocation data identifying at least one assigned frequency block;

receiving second resource allocation data identifying an allocation of resource blocks, wherein said second resource allocation data is dependent on the at least one assigned frequency block;

determining the at least one assigned frequency block using the received first allocation data; and determining the allocation of resource blocks based on the received second resource allocation data and the determined at least one assigned frequency block.]

[14. A method as claimed in claim 13, wherein said resource blocks are grouped in a sequence of resource block groups; wherein said sequence of resource block groups comprises at least one allocated resource block group comprising said determined allocation of resource blocks; and wherein said second resource allocation data is arranged for identifying the at least one allocated resource block group, thereby to identify said determined allocation of resource blocks.]

[15. A method as claimed in claim 14, wherein said second resource allocation data is arranged for identifying the relative position of the at least one allocated resource block group in said sequence of resource block groups.]

[16. A method as claimed in claim 14, wherein said second resource allocation data is arranged for identifying the relative position of the at least one allocated resource block group in said sequence of resource block groups.]

[17. A method as claimed in claim 14, wherein the number of bits in said second resource block allocation data is dependent on the number of frequency blocks assigned for use by said user device.]

[18. A method as claimed in claim 14, wherein the number of bits in said second resource block allocation data remains the same regardless of the number of frequency blocks assigned for use by said user device.]

[19. A method as claimed in claim 14, wherein the number of resource blocks in each resource block group is dependent on the number of assigned frequency blocks.]

[20. A method as claimed in claim 13, wherein said allocation of resource blocks comprises at least one contiguous sequence of resource blocks, and wherein said second resource allocation data comprises a value which encodes a position of a start resource block of the contiguous sequence and the number of resource blocks in the contiguous sequence.]

[21. A method as claimed in claim 20 wherein said allocation of resource blocks comprises a contiguous sequence of resource blocks in each assigned frequency block, wherein each contiguous sequence comprises the same number of resource blocks, and wherein the start resource block of each contiguous sequence has the same relative position in the frequency block in which it is located.]

[22. A method as claimed in claim 20, wherein said allocation of resource blocks comprises a contiguous sequence of resource blocks starting in a first assigned frequency block and ending in a second assigned frequency block.]

[23. A method as claimed in claim 13, wherein said first resource allocation data comprises a frequency block assignment bit mask, and wherein the or each assigned frequency block is respectively represented by at least one bit of said frequency block assignment bit mask.]

[24. A method as claimed in claim 13, wherein said at least one assigned frequency block comprises a plurality of said frequency blocks; and wherein during said determining the allocation of resource blocks the sequence of resource blocks in each of the assigned frequency blocks are treated as a concatenated sequence, and said resource allocation data is interpreted as indicating the position of said allocated resource blocks in said concatenated sequence.]

[25. A communication node which is operable to communicate with a plurality of user devices in a communication system which uses a plurality of frequency blocks in each of which a plurality of sub-carriers are arranged in a sequence of resource blocks, the communication node comprising:

means for determining at least one frequency block assigned for use by a user device;

means for determining an allocation of resource blocks within the at least one identified frequency block, for use by said user device;

means for generating first resource allocation data identifying the at least one determined frequency block for the user device;

means for generating second resource allocation data identifying the determined allocation of resource blocks for the user device, wherein said second resource allocation data is dependent on the determined at least one frequency block assigned for use by the user device; and means for signalling said first and second resource allocation data to said user device.]

[26. A user device which is operable to communicate with a communication node in a communication system which uses a plurality of frequency blocks in each of which a plurality of sub-carriers are arranged in a sequence of resource blocks, the user device comprising:

means for receiving first resource allocation data identifying at least one assigned frequency block;

means for receiving second resource allocation data identifying an allocation of resource blocks, wherein said second resource allocation data is dependent on the at least one assigned frequency block;

means for determining the at least one assigned frequency block using the received first allocation data; and means for determining the allocation of resource blocks based on the received second resource allocation data and the determined at least one assigned frequency block.]

[27. A communication node which is operable to communicate with a plurality of user devices in a communication system which uses a plurality of frequency blocks in each of which a plurality of sub-carriers are arranged in a sequence of resource blocks, the communication node comprising:

a determiner operable to determine at least one frequency block assigned for use by a user device;

a determiner operable to determine an allocation of resource blocks within the at least one identified frequency block, for use by said user device;

a generator operable to generate first resource allocation data identifying the at least one determined frequency block for the user device;

a generator operable to generate second resource allocation data identifying the determined allocation of resource blocks for the user device, wherein said second resource allocation data is dependent on the determined at least one frequency block assigned for use by the user device; and a signaller operable to signal said first and second resource allocation data to said user device.]

[28. A user device which is operable to communicate with a communication node in a communication system which uses a plurality of frequency blocks in each of which a plurality of sub-carriers are arranged in a sequence of resource blocks, the user device comprising:

a receiver operable to receive first resource allocation data identifying at least one assigned frequency block;

a receiver operable to receive second resource allocation data identifying an allocation of resource blocks, wherein said second resource allocation data is dependent on the at least one assigned frequency block;

a determiner operable to determine the at least one assigned frequency block using the received first allocation data; and a determiner operable to determine the allocation of resource blocks based on the received second resource allocation data and the determined at least one assigned frequency block.]

[29. A method of signalling resource allocation data in a communication system which operates over a system bandwidth comprising a plurality of frequency blocks, each frequency block having a plurality of sub-carriers arranged in a sequence of resource blocks, each having a resource block index value that is unique within the system bandwidth, the method comprising:

determining, using said index values, an allocation of a contiguous sequence of resource blocks for a user device having a bandwidth corresponding to a subset of said frequency blocks;

generating resource allocation data encoding the determined allocation of resource blocks for the user device, wherein said resource allocation data encodes the relative position of the contiguous sequence within the system bandwidth; and signalling said resource allocation data to the user device.]

[30. A method as claimed in claim 29, wherein said resource allocation data comprises a value which encodes a relative position of a start resource block of the contiguous sequence in said system bandwidth and the number of resource blocks in the contiguous sequence.]

[31. A method as claimed in claim 29, wherein said method comprises identifying reserved resource blocks and other resource blocks, and allocating said unique index values to said other resource blocks but not to said reserved resource blocks.]

*32. A method performed by a base station, the method comprising:*

*communicating with a mobile telephone on multiple frequency blocks; and*

*transmitting, to the mobile telephone, first information and second information,*

*wherein the first information indicates at least one frequency block, and*

*wherein the second information indicates at least one resource block within the at least one frequency block, the at least one resource block being allocated for the mobile telephone.*

*33. A method performed by a mobile telephone, the method comprising:*

*communicating with a base station on multiple frequency blocks; and*

*receiving, from the base station first information and second information,*

*wherein the first information indicates at least one frequency block, and*

*wherein the second information indicates at least one resource block within the at least one frequency block, the at least one resource block being allocated for the mobile telephone.*

*34. A base station comprising:*

*a transceiver circuit; and*

*a controller coupled to the transceiver circuit and that:*

*controls the transceiver circuit to communicate with a mobile telephone on multiple frequency blocks; and*

*controls the transceiver circuit to transmit, to the mobile telephone first information and second information,*

*wherein the first information indicates at least one frequency block, and*

*wherein the second information indicates at least one resource block within the at least one frequency block, the at least one resource block being allocated for the mobile telephone.*

*35. A mobile telephone comprising:*

*a transceiver circuit; and*

*a controller coupled to the transceiver circuit and that:*

*controls the transceiver circuit to communicate with a base station on multiple frequency blocks; and*

*controls the transceiver circuit to receive, from the base station first information and second information,*

*wherein the first information indicates at least one frequency block, and*

*wherein the second information indicates at least one resource block within the at least one frequency block, the at least one resource block being allocated for the mobile telephone.*

*36. The method according to claim 32, wherein the at least one resource block is used for transmitting a Physical Downlink Shared Channel (PDSCH).*

*37. The method according to claim 32, wherein the at least one resource block is used for receiving a Physical Uplink Shared Channel (PUSCH).*

*38. The method according to claim 33, wherein the at least one resource block is used for receiving a Physical Downlink Shared Channel (PDSCH).*

*39. The method according to claim 33, wherein the at least one resource block is used for transmitting a Physical Uplink Shared Channel (PUSCH).*

* * * * *